(12) United States Patent
deWijs et al.

(10) Patent No.: US 11,500,145 B2
(45) Date of Patent: Nov. 15, 2022

(54) LIGHT GUIDES WITH COATING FOR USE IN WATER

(71) Applicant: KONINKLIJKE PHILIPS N.V., Eindhoven (NL)

(72) Inventors: Willem-Jan Arend deWijs, Oss (NL); Cornelis Gerardus Visser, Eindhoven (NL); Michael Maria Johannes van Lierop, Nederweert (NL)

(73) Assignee: Koninklijke Philips N.V., Eindhoven (NL)

( * ) Notice: Subject to any disclaimer, the term of this patent is extended or adjusted under 35 U.S.C. 154(b) by 336 days.

(21) Appl. No.: 16/631,474

(22) PCT Filed: Jul. 18, 2018

(86) PCT No.: PCT/EP2018/069564
§ 371 (c)(1),
(2) Date: Jan. 16, 2020

(87) PCT Pub. No.: WO2019/016291
PCT Pub. Date: Jan. 24, 2019

(65) Prior Publication Data
US 2020/0183119 A1    Jun. 11, 2020

(30) Foreign Application Priority Data

Jul. 18, 2017    (EP) ..................................... 17181832

(51) Int. Cl.
*B01J 19/12* (2006.01)
*B63B 59/04* (2006.01)
(Continued)

(52) U.S. Cl.
CPC ............ *G02B 6/005* (2013.01); *B01J 19/123* (2013.01); *B63B 59/04* (2013.01); *G02B 1/18* (2015.01);
(Continued)

(58) Field of Classification Search
CPC ........ B01J 19/123; B08B 17/02; B63B 59/04; G02B 1/18; G02B 6/0021; G02B 6/004;
(Continued)

(56) References Cited

U.S. PATENT DOCUMENTS 4,271,210 A    6/1981    Lukacsek
5,743,951 A    4/1998    Ozai et al.
(Continued)

FOREIGN PATENT DOCUMENTS

JP    2005066914 A1    3/2005
JP    2014124781 A     7/2014

OTHER PUBLICATIONS

Hale et al "Optical Constraints of Water in the 200-nm to 200um Wavelength Region" Applied Optics 1973 vol. 12 No. 3, p. 555-563.
(Continued)

*Primary Examiner* — Ryan A Lepisto

(57) ABSTRACT

An antifouling layer stack comprising a first layer element, a silicone layer, and a second layer element. The silicone layer is a light guide for UV radiation, and may include embedded UV light sources. The first layer element is situated on a first surface of the silicone layer, and the second layer element is situated on a second surface of the silicone layer. The first and second layer elements differ in composition from the silicone layer. The first layer element facilitates transmission of the UV radiation from the silicone layer to an external medium, and may provide protection and improve the structural integrity of the stack. The second layer element may also provide protection and structural integrity. The second layer element may be reflective, and may provide an adhesive surface for attaching the stack to a vessel.

20 Claims, 10 Drawing Sheets

(51) Int. Cl.
  *G02B 1/18* (2015.01)
  *F21V 8/00* (2006.01)
  *G02B 6/02* (2006.01)
  *G02B 6/44* (2006.01)
  *B08B 17/02* (2006.01)

(52) U.S. Cl.
  CPC ............ *G02B 6/0021* (2013.01); *B08B 17/02* (2013.01); *G02B 6/004* (2013.01); *G02B 6/0055* (2013.01); *G02B 6/0065* (2013.01); *G02B 6/02033* (2013.01); *G02B 6/4494* (2013.01)

(58) Field of Classification Search
  CPC .... G02B 6/005; G02B 6/0055; G02B 6/0065; G02B 6/02033; G02B 6/4494
  See application file for complete search history.

(56) References Cited

U.S. PATENT DOCUMENTS

| | | | |
|---|---|---|---|
| 8,779,391 B2* | 7/2014 | Flaherty | A61L 2/10 250/461.1 |
| 9,572,903 B2* | 2/2017 | Dobrinsky | G09B 5/06 |
| 9,611,016 B2* | 4/2017 | Salters | A61L 2/10 |
| 9,687,577 B2* | 6/2017 | Dobrinsky | A43B 17/10 |
| 10,183,084 B2* | 1/2019 | Cahan | A61L 2/24 |
| 10,556,651 B2 | 2/2020 | Salters et al. | |
| 2007/0242352 A1 | 10/2007 | Macmaster | |
| 2008/0165542 A1 | 7/2008 | Kim et al. | |
| 2010/0246170 A1 | 9/2010 | Yang | |
| 2011/0111203 A1 | 5/2011 | Roemer-Scheuermann et al. | |
| 2011/0226966 A1* | 9/2011 | Takahashi | C02F 1/325 250/492.1 |
| 2011/0286222 A1 | 11/2011 | Coleman | |
| 2011/0291995 A1* | 12/2011 | Shr | E05B 1/0069 250/492.1 |
| 2012/0237676 A1 | 9/2012 | Kalyankar et al. | |
| 2013/0048877 A1* | 2/2013 | Thoren | B08B 17/02 250/492.1 |
| 2014/0140091 A1 | 5/2014 | Vasylyev | |
| 2014/0196745 A1 | 7/2014 | Whelan et al. | |
| 2016/0128526 A1* | 5/2016 | Dobrinsky | A47K 13/302 4/233 |
| 2016/0137276 A1* | 5/2016 | Salters | A61L 2/10 114/222 |
| 2016/0137528 A1* | 5/2016 | Wipprich | C02F 1/325 250/492.1 |
| 2016/0184789 A1 | 6/2016 | Takagi et al. | |
| 2017/0152419 A1* | 6/2017 | Rantala | H01L 33/56 |
| 2017/0281812 A1* | 10/2017 | Dobrinsky | A61L 2/10 |
| 2018/0186436 A1 | 7/2018 | Salters | |
| 2018/0204977 A1 | 7/2018 | Dheeraj et al. | |
| 2019/0099613 A1* | 4/2019 | Estes | A61L 2/10 |

OTHER PUBLICATIONS

Bart et al "Room Temperature Intermediate Layer Bonding for Microfluidic Devices" Lab Chip 2009 9 p. 3481-3488.
Li et al "Optical Characterization of RTV615 Silicon Rubber Compound" Journal of Instrumentation vol. 9, No. 7, Jul. 10, 2014.
International Search Report and Written Opinion from PCT/EP2018/069564 dated Jan. 9, 2019.
Wu et al "A Novel Route to Control Refractive Index of Sol-Gel Derived Nano-porous Silica Films . . . " Materials Science Engineering B 78, p. 135-139.

* cited by examiner

LIGHT GUIDES WITH COATING FOR USE IN WATER

CROSS-REFERENCE TO PRIOR APPLICATIONS

This application is the U.S. National Phase application under 35 U.S.C. § 371 of International Application No. PCT/EP2018/069564, filed on Jul. 18, 2018, which claims the benefit of EP Patent Application No. EP 17181832.1, filed on Jul. 18, 2017. These applications are hereby incorporated by reference herein.

FIELD OF THE INVENTION

The invention relates to a layer stack comprising a silicone layer as well as the use of such layer stack. The invention also relates to an object with such layer stack on a surface of such object. The invention further relates to a method for assembling such layer stack.

BACKGROUND OF THE INVENTION

Anti-biofouling methods are known in the art. US2013/0048877, for instance, describes a system for anti-biofouling a protected surface, comprising an ultraviolet light source configured to generate ultraviolet light, and an optical medium disposed proximate to the protected surface and coupled to receive the ultraviolet light, wherein the optical medium has a thickness direction perpendicular to the protected surface, wherein two orthogonal directions of the optical medium orthogonal to the thickness direction are parallel to the protected surface, wherein the optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

US2014/140091 describes an illumination system employing a waveguide. Light received from an edge or an end of a waveguide is propagated in response to transmission and total internal reflection. Light deflecting elements distributed along the propagation path of light continuously change the out-of-plane propagation angle of light rays and cause decoupling of portions of the propagated light from the core of the waveguide at different distances from the light input edge or end. Light escapes from the waveguide into an intermediate layer at low out-of-plane angles and is further redirected by light extraction features out of the system. In one embodiment, the illumination system is configured to emit collimated light. In one embodiment, the illumination system includes shallow surface relief features. In one embodiment, the light deflecting elements include forward-scattering particles distributed throughout the volume of the waveguide. Additional collimating and non-collimating illumination units and methods are also disclosed.

SUMMARY OF THE INVENTION

Biofouling or biological fouling (herein also indicated as "fouling" or "biofouling") is the accumulation of microorganisms, plants, algae, and/or animals on surfaces. The variety among biofouling organisms is highly diverse and extends far beyond attachment of barnacles and seaweeds. According to some estimates, over 1700 species comprising over 4000 organisms are responsible for biofouling. Biofouling is divided into microfouling which includes biofilm formation and bacterial adhesion, and macrofouling which is the attachment of larger organisms. Due to the distinct chemistry and biology that determine what prevents organisms from settling, these organisms are also classified as hard or soft fouling types. Calcareous (hard) fouling organisms include barnacles, encrusting bryozoans, mollusks, polychaete and other tube worms, and zebra mussels. Examples of non-calcareous (soft) fouling organisms are seaweed, hydroids, algae and biofilm "slime". Together, these organisms form a fouling community.

In several circumstances biofouling creates substantial problems. Machinery stops working, water inlets get clogged, and hulls of ships suffer from increased drag. Hence the topic of anti-fouling, i.e. the process of removing or preventing fouling from forming, is well known. In industrial processes, bio-dispersants can be used to control biofouling. In less controlled environments, organisms are killed or repelled with coatings using biocides, thermal treatments or pulses of energy. Non-toxic mechanical strategies that prevent organisms from attaching include choosing a material or coating with a slippery surface, or creation of nanoscale surface topologies similar to the skin of sharks and dolphins which only offer poor anchor points. Biofouling on the hull of ships causes a severe increase in drag, and thus increased fuel consumption. It is estimated that an increase of up to 40% in fuel consumption can be attributed to biofouling. As large oil tankers or container transport ships can consume up to €200.000 a day in fuel, substantial savings are possible with an effective method of anti-biofouling.

It surprisingly appears that one may effectively use UV radiation to substantially prevent biofouling on surfaces that are in contact with sea water or water in lakes, rivers, canals, etc. Herewith, an approach is presented based on optical methods, in particular using ultra-violet light or radiation (UV). It appears that most micro-organisms are killed, rendered inactive or unable to reproduce with sufficient UV light. This effect is mainly governed by the total dose of UV light. A typical dose to kill 90% of a certain micro-organism is 10 mW/h/m$^2$.

In specific embodiments, an average dose (of the UV radiation) over time is selected from the range of at least 10 J/m$^2$, like especially selected from the range of 100-3000 J/m$^2$.

Especially good results may be obtained with a substantial constant UV radiation of at least about $0.5*10^{-9}$ Watt/mm$^2$, like at least about $10^{-9}$ Watt/mm$^2$, such as at least about $1.5*10^{-9}$ Watt/mm$^2$, relative to the area of the light emissive surface, like no more than $10^{-6}$ Watt/mm$^2$, such as no more than $0.5*10^{-7}$ Watt/mm$^2$, like no more than $10^{-7}$ Watt/mm$^2$.

UV radiation, however, can also be used for applications other than anti-fouling of aquatic (such as marine) objects. UV radiation may also be used to clean objects or to keep objects clean from bacteria, etc.

The term "aquatic" and similar terms may refer to both freshwater and salt water applications (and of course also brackish water applications).

In the past, lighting modules for anti-fouling of a protected surface have been proposed comprising at least one light source for generating an anti-fouling light, an optical medium for distributing at least part of the anti-fouling light through the optical medium, the optical medium comprising an emission surface for emitting the distributed anti-fouling light in a direction away from the protected surface when the lighting module is arranged in, on and/or near the protected surface, and wherein the emission surface is a substantially planar surface. Especially, the optical medium comprises a silicone material, in particular a silicone material selected from the group comprising methyl-silicones, and/or UV grade silica material. A common problem with light guides is that too much light may escape at some parts, and too little may escape at other parts, which may lead to a sub-optimal distribution of the escaped light. For instance, depending on the position on the surface light needs to either get out, or e.g. closer to the LED the light needs to be kept in the (silicone) layer which functions as a light guide. The latter can be done in several ways. For instance, collimation by applying small reflectors or lenses close to the LEDs may be used. However, this may include additional optical elements, which may make the module more expensive and may make the production process more complex. Further, the dimensions of the module may also substantially increase. Herein, the terms "silicone" and "siloxane" are interchangeably used. Here, the term "siloxane" especially refers to polysiloxanes, i.e. to materials that are solid at room temperature and have a backbone of Si—O—Si— groups.

Further, light guides may deteriorate upon contact with chemicals or may not have enough strength when provided as relatively thin (but UV transparent) layer.

Hence, it is an aspect of the invention to provide an alternative layer stack, which preferably further at least partly obviates one or more of above-described drawbacks. Further, it is an aspect of the invention to provide a method for providing such layer stack.

The present invention may have as object to overcome or ameliorate at least one of the disadvantages of the prior art, or to provide a useful alternative.

Herein, a solution is proposed wherein the high transparency of an optical layer, especially a silicone layer, is combined with one or more layers that provide an additional function, and which allow the optical layer to be thin and/or e.g. be of a high transparency silicone. High transparency silicones are for example characterized by a low content of functional groups on the siloxane backbone that allow cross-linking, a low content of catalyst molecules that facilitate crosslinking, and optionally (a high content of) catalyst protection molecules that stabilize the catalyst, preventing UV-absorption of the catalyst. Especially, the transmission for UV-C, even more especially for about 270 nm, is at least about 50%/10 mm, especially at least about 70%/10 mm, even more especially at least about 80%/10 mm.

Therefore, in a first aspect the invention provides a layer stack comprising a first layer, especially a layer having a relatively high transmission for UV radiation in embodiments especially a first silicone layer, wherein the first layer (herein further also indicated by referring to the specific embodiment of the silicone layer or by referring to "light guide") has a first surface and a second surface (defining a thickness (d1) of the first silicone layer), wherein the first silicone layer is especially transmissive for UV radiation having one or more wavelengths selected from the range of 200-380 nm, wherein the layer stack further comprises one or more of (i) a first layer element configured at a first side of the first surface, wherein in specific embodiments the first layer element is associated by a chemical binding with the first surface directly or via a first intermediate layer, which is transmissive for UV radiation having one or more wavelengths selected from the range of 200-380 nm, wherein the first layer element at least comprises a first layer differing in composition from the first silicone layer, and wherein the first layer element is transmissive for UV radiation having one or more wavelengths selected from the range of 200-380 nm; and (ii) a second layer element configured at a second side of the second surface wherein in specific embodiments the second layer element is associated by a chemical binding with the second surface directly or via a second intermediate layer, wherein the second layer element at least comprises a second layer differing in composition from the first silicone layer.

In a further aspect, the invention also provides an object comprising a surface, such as an external surface, wherein a layer stack as defined herein is attached to at least part of the surface.

In yet another aspect, the invention provides a method for providing a layer stack, such as especially defined herein, the method comprising binding (i) a first layer, especially a layer having a relatively high transmission for UV radiation and/or visible light, especially for UV radiation, in embodiments especially a first silicone layer and (ii) one or more of a first layer element and a second layer element, by one or more of (i) associating by a chemical binding a first surface of the first layer (herein further also indicated by referring to the specific embodiment of the silicone layer and the first layer element directly, or via a first intermediate layer, and (ii) associating by a chemical binding a second surface of the silicone layer and the second layer element directly, or via a second intermediate layer. With such layer stack, it is possible to provide a layer that can be used in combination with a UV light source as anti-biofouling system. Further, such layer stack may include a waveguide (herein also indicated as "light guide") with a high UV transparency and a relatively efficient outcoupling. Yet further, such layer stack may have a relatively high strength and/or impermeability for molecules or other species that may absorb UV (and thereby lead to deterioration of the layer stack). Further, such layer stack may have adhesive properties. Further, such layer stack may have a relatively high stability, as two or more layers in the layer stack are chemically bound. Hence, with such layer stack, it may be possible to essentially block molecules entering the light guide. Such molecules, like organic molecules, may (over time) lead to a reduction of the UV transmissiveness of the light guide. Further, with such light guide element it is possible to (better) spread the UV radiation over the light guide, as at the outcoupling side, part of the light will be reflected due to total internal reflection, leading to a further spreading of the UV radiation over the light guide. Further, with such layer stack it may be possible to increase the transmissiveness of the light guide, which in embodiments may imply using a mechanically weaker but UV more transparent silicone. With a layer element, mechanical strength may then be retained or even improved. Also the thickness of the light guide may be reduced. Further, with such layer stack UV radiation that escapes at an undesired side may be reflected back into the light guide (for instance UV radiation that may escape at the second light guide face). Yet further, with such layer stack it is possible to provide an adhesive layer. For instance, a silicone light guide may lead to difficulties when adhering to an object. However, when an addition layer is provided that binds well with the light guide and has adhesive properties, this problem is solved. Note that one or more layers may have one or more functionalities. For instance, an adhesive layer may also provide (total internal) reflective properties to the light guide. Hence, in an aspect the invention provides an anti-biofouling system. In yet a further aspect, the invention also provides the use of the stack layer according as defined herein, in (functional) combination with a UV light source, as an anti-biofouling system.

As indicated above, the invention provides a layer stack. The layer stack at least comprises two layers. Further, especially at least two layers of the layers stack are chemically bound to each other. Hence, the layers stack does not comprise a mere laminate of two or more layers, but may comprise a laminate wherein at least two (adjacent) layers are chemically bound to each other. This adds to the stability of the layer stack, which may be subjected to mechanical stress etc., during its lifetime.

The layer stack comprises a first layer. This first layer is especially configured a wave guide (also indicated as "light guide"). The first layer may be used for wave guiding UV radiation. The first layer may also be indicated as optical medium, and may in specific embodiments comprise silicone. The optical medium may be provided as a (silicone) foil for applying to a surface. In embodiments the foil has a thickness in an order of magnitude of a couple of millimeters to a few centimeters, such as 0.05-5 cm, like 0.1-5 cm, like 0.2-2 cm. In embodiments, the foil is not substantially limited in any direction perpendicular to the thickness direction so as to provide substantially large foil having sizes in the order of magnitude of tens or hundreds of square meters. The foil may be substantially size-limited in two orthogonal directions perpendicular to the thickness direction of the foil, so as to provide an anti-fouling tile; in another embodiment the foil is substantially size-limited in only one one direction perpendicular to a thickness direction of the foil, so as to provide an elongated strip of anti-fouling foil. Hence, the optical medium, may be provided as tile or as strip.

The layer especially has a relatively high transmission for UV radiation and/or visible light, especially for UV radiation. Especially, the optical layer is transmissive for UV radiation. Therefore, especially the material of the optical layer is transmissive for UV radiation. Hence, this material is herein also indicated as UV radiation transmissive optical layer material. For instance, by the layer height of the optical layer the outcoupling of UV radiation from the light source (see also below) can be controlled. Herein, "transmissive" may e.g. indicate that at least 5% of the UV radiation of the light source (that escapes from the light guide) is transmitted through the optical layer, especially at least 10%, such as even more especially at least 20%, such as at least 40%, like in the range of 40-95%, or even higher. Note that this transmission thus applies to radiation that is not kept in the light guide, e.g. due to the angle of incidence. Here, the value of the transmission especially refers to radiation propagating perpendicular to layer thickness. The transmission or light permeability can be determined by providing light at a specific wavelength with a first intensity to the material and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989). In specific embodiments, the transmission for one or more wavelengths in the UV is at least 1%, such as at least 2%, like at least 5%, such as at least 10%, over the length of the light guide.

In specific embodiments, a material may be considered UV transmissive when the transmission of UV radiation at a wavelength in the UV, especially at a wavelength or in a wavelength range of radiation generated by a source of radiation as herein described, such as 280 nm, or UVB and/or UVC radiation, through a 1 mm thick layer of the material (such as silicone or water), especially even through a 5 mm thick layer of the material, under perpendicular irradiation with said UV radiation is at least about 50%, such as especially at least about 60%, such as more especially at least about 80%, such as at least about 85%, such as even at least about 90%. Hence, in embodiments the transmission for UV radiation, especially 280 nm, is at least 80%/mm, even more especially at least 80%/5 mm, such as at least about 50%/10 mm. The term "transmission" especially refers to internal transmission. The term "internal transmittance" refers to energy loss by absorption, whereas the term "total transmittance" or "transmittance" refers to transmission taking into account absorption, scattering, reflection, etc. The transmission may be relatively large; even the total transmittance through a 5 mm thick layer of the material, under perpendicular irradiation with the (above-indicated) UV radiation may be at least about 80%, such as at least about 85%, like at least about 90%. Hence, the phrase "the transmission for UV-C, even more especially for about 270 nm, is at least about 50%/10 mm" and similar phrases especially refer to the internal transmission.

In specific embodiments, the internal transmission is at least 65%/cm.

As indicated above, the first layer especially is a first silicone layer. The first layer has a first surface and a second surface. The first surface and the second surface may define a thickness (d1) of the first silicone layer. This thickness may be constant or may vary. In general, the thickness will essentially be constant over the light guide. Especially, the thickness may be selected from the range of 0.5-50 mm, such as 1-50 mm. In specific embodiments, the thickness is at maximum 5 mm, such as in the range of 0.5-2.5 mm, like 1-2 mm.

As indicated above, this first layer, especially the first silicone layer is especially transmissive for UV radiation having one or more wavelengths selected from the range of 200-380 nm. In further embodiments, the first silicone layer is especially transmissive for UV radiation having one or more wavelengths selected from one or more of the UV-A, UV-B, and UV-C ranges.

Ultraviolet (UV) is that part of electromagnetic light bounded by the lower wavelength extreme of the visible spectrum and the X-ray radiation band. The spectral range of UV light is, by definition between about 100 and 400 nm (1 nm=$10^{-9}$ m) and is invisible to human eyes. Using the CIE classification the UV spectrum is subdivided into three bands: UVA (long-wave) from 315 to 400 nm; UVB (medium-wave) from 280 to 315 nm; and UVC (short-wave) from 100 to 280 nm. In reality many photobiologists often speak of skin effects resulting from UV exposure as the weighted effect of wavelength above and below 320 nm, hence offering an alternative definition. The terms "visible", "visible light" or "visible emission" refer to light having a wavelength in the range of about 380-780 nm.

A strong germicidal effect is provided by the light in the short-wave UVC band. In addition, erythema (reddening of the skin) and conjunctivitis (inflammation of the mucous membranes of the eye) can also be caused by this form of light. Because of this, when germicidal UV-light lamps are used, it is important to design systems to exclude UVC leakage and so avoid these effects. In case of immersed light sources, absorption of UV light by water may be strong enough that UVC leaking is no problem for humans above the liquid surface. Hence, in an embodiment the UV radiation (anti-fouling light) comprises UVC light. In yet another embodiment, the UV radiation comprises radiation selected from a wavelength range of 100-300 nm, especially 200-300 nm, such as 230-300 nm. Hence, the UV radation may especially be selected from UVC and other UV radiation up to a wavelength of about 300 nm. Good results are obtained with wavelengths within the range of 100-300 nm, such as 200-300 nm.

As indicated above, the first layer per se may not be strong enough or may not easily be attached to a surface of an object or may be vulnerable to ingress of undesired species. Therefore, one or more further layers may be combined with this first layer. This may imply providing a further layer to the first layer, but alternatively or additionally, this may also imply providing the first layer to another layer. Unless indicated otherwise, both embodiments are included herein (see further also below when discussing the method for providing the layer stack). Hence, the layer stack at least comprises the first layer, and yet a further layer. In specific embodiments, at one or both sides of the first layer one or more layers may be provided.

Therefore, especially the layer stack further comprises one or more of a first layer element configured at a first side of the first surface and a second layer element configured at a second side of the second surface. The first layer element and the second layer element may thus in embodiments independently be selected. Hence, one of these or both may be present. Each layer element includes at least one layer. Here, the term layer may especially refer to an integral layer, unless indicated otherwise.

Especially in view of obtaining a strong stack, two or more layers are chemically bound. Alternatively or additionally, a chemically bound layer may provide properties to the stack which would not be available when a pure first layer, such as a silicone layer would be applied (see also above).

Hence, in specific embodiments the first layer element is associated by a chemical binding with the first surface directly or via a first intermediate layer. Alternatively or additionally, in specific embodiments the second layer element is associated by a chemical binding with the second surface directly or via a second intermediate layer. The first intermediate layer may be considered part of the first layer element. Likewise, the second intermediate layer may be considered part of the second layer element.

A direct binding implies that a first or second layer and another layer form a laminate with chemical bonds providing attachment. It may also be possible that there are one or more intermediate layers. Hence, in other embodiments the binding of first layer element and/or the second layer element may be via an intermediate layer(s), herein indicated as first intermediate layer and second intermediate layer, respectively. Note that terms like "first layer", "second layer", "intermediate layer" may each independently also refer to a plurality of (different) layers. The term "layer" may also refer to a multi-layer of essentially identical layers, which thereby form a multi-layer.

The terms "first" and "second" are essentially only used to distinguish layers. The first layer element is associated with the first surface. This first layer element is especially transmissive for UV radiation, especially having one or more wavelengths selected from the range of 200-380 nm. Hence, when a first intermediate layer is applied, also such intermediate layer is transmissive for UV radiation, especially having one or more wavelengths selected from the range of 200-380 nm. Dependent upon the embodiments, also the second intermediate layer may be transmissive for UV radiation, especially having one or more wavelengths selected from the range of 200-380 nm; see also below.

The first layer element at least comprises a first layer differing in composition from the first silicone layer. Likewise, the second layer element at least comprises a second layer differing in composition from the first silicone layer.

The differences in compositions between on the one hand the layers of the first layer element and/or second layer element and on the other hand the first layer may be based on using an essentially different type of material, such as a first silicone layer and one or more fluoropolymer layers for the first layer element and/or the second layer element. However, this may also be based on using also one or more silicone layers for the first layer element and/or the second layer element that have a different composition than a silicone first layer. This difference may be in one or more of type and concentration of the side groups (and/or end groups) on the siloxane backbone (e.g. methyl, vinyl), additives, such as catalyst type and concentration, catalyst stabilizing molecules, average length of the siloxane chains or crosslink density, etc. The first silicone layer may be relatively thin and transparent, but also relatively weak and/or vulnerable to ingress of UV absorbing species. The optional silicone layer(s) in one or more of the first layer element and the second layer element may especially have functionalities that improve the properties of the layer stack. In embodiments, the first layer element has one or more functionalities selected from the group consisting of (a) partly reflective for UV radiation, (b) reinforcing the layer stack, and (c) protective for the first silicone layer. Such one or more functionalities may be provided with one or more layers. As the light guide may be relatively thin and may also be relatively weak, it may be desirable to provide a reinforcing layer (at the side of the first light guide face and/or at the side of the second light guide face). Therefore, in embodiments the first layer element has one or more of (i) a larger compression strength, (ii) a larger tangent Modulus (Young's modulus), and (iii) a larger toughness than the light guide. For instance, this can be at least 5%, such as at least 10%, like at least 20% larger. In this way, the light guide element may have an increased strength.

In specific embodiments, the first layer element comprises one or more of (i) an aluminum layer, a silicone layer, and a polymeric layer comprising a fluoropolymer, more especially the first layer element comprises one or more of (i) an aluminum layer, and a polymeric layer comprising a fluoropolymer. The aluminum layer will be relatively thin, in view of the transmission of the first layer element. Hence, in embodiments the first layer element comprises an aluminum layer having a thickness selected from the range of 5-40 nm, especially in the 5-20 nm range, which may still be (to some extend) transmissive for UV radiation. Alternatively or addition, the aluminum layer may not be a continuous layer, but a plurality, optionally regularly patterned, of aluminum islands. In this way, the aluminum islands may have a thickness in the same range, or higher, as UV transmission may occur between the aluminum islands. The distribution of the islands may be regular or irregular or a combination thereof (such as quasi regular). When aluminum islands are applied, these islands may be thicker, such as in the range of 40-100 nm, like 50-90 nm. Below about 100 nm, Al may start being transmissive for UV radiation. For instance, using islands of Al of ~50-90 nm right above the LEDs may limit the transmission to the level that still anti-fouling effect is obtained, but the reflected light can travel further from the LEDs. Hence, for the front layer (to water), islands of (partially transmissive) Al (on e.g. FEP or other fluoro polymer), especially aligned to the LED positions, may be beneficial. On the back layer (such as facing a ship vessel, for instance), an aluminum layer may need to be as reflective as possible, and thus especially at least 100 nm thick. Hence, when islands are applied, the islands and light sources may be aligned, for maximum transmission or maximum reflection.

The aluminum layer, be it a continuous layer or a layer with a distribution of islands may be deposited, such as via (plasma enhanced) chemical or physical vapor deposition, on a layer, especially a polymeric layer. Such layer may be a silicone layer, but may also be a (organic) polymeric layer. Especially, the polymeric material comprises one or more of fluorinated ethylene, fluorinated propylene, fluorinated ethylene propylene, and fluorinated propylene acetate. Such polymeric materials may be relatively strong, stable, and UV radiation transmissive. One side of the aluminum layer may be directed to the first (silicone layer); another side of the aluminum layer may be in contact with another layer, such as a silicone layer or a polymeric layer, especially a polymeric layer, such as even more especially a fluoropolymer.

In this way, in embodiments a stack may be provided comprising the first layer, especially a silicone layer, an aluminum layer, and a further layer, especially a fluoropolymer. The first layer element may thus in embodiments comprise an aluminum layer, and a further layer, especially a fluoropolymer. As indicated above, the first layer element is especially transmissive for UV radiation, such as for one or more wavelengths selected from the wavelength range of 200-380 nm.

Especially, the first layer may (also) comprise a silicone layer having a larger mechanical strength than the light guide (which may thus essentially consist of a silicone, like for instance Lumisil L400). For instance, both the light guide and the first layer may comprise a silicone. However, the UV transmission of the light guide may be higher, whereas the UV transmission of the silicone layer may be lower (than of the light guide).

The first layer element will at least transmit at least part of the UV radiation. However, the first layer element may also reflect part of the UV radiation. Amongst others, this may be obtained with a UV radiation transmissive layer having an index of refraction (in the UV) smaller than the index of refraction of the material of the light guide (see further also below).

Alternatively or additionally, the first layer element may comprise one or more layers that block penetration of molecules in the light guide. As there may be a (small) diffusion of molecules form the outside in the light guide, this may lead to a reduction of UV transmissiveness, as in general such molecules, like (UV-absorbing) organic molecules may lead to degradation products and/or may weaken the structure of the light guide material. Therefore, in embodiments the first layer element is configured to impede ingress of organic molecules into the light guide. Hence, the first layer element may have a protective function. Alternatively or additionally, the first layer element may be configured to impede ingress of inorganic molecules. Yet further, alternatively or additionally, the first layer element may be configured to impede ingress of ions. In embodiments, the term "ion" may also refer to a charged organic molecule (by way of example a charged organic molecule is e.g. acetate) or an inorganic molecule (by way of example, a charged inorganic molecule is silicate).

Especially, the species to be block is a species that absorb UV-C light, like a UV-light absorbing (organic) molecule. Especially, the organic molecules to be blocked typically, but not exclusively, contain at least one double bond, be it an ester, carbonyl, vinyl, alkyne, urethane etc. These molecules can both be generated by organisms in the sea, as well as be present in the sea due to outside influences (oil spills and other industrial activities).

Alternatively or additionally, the first layer element may be applied for preventing ingress of water in the light guide and/or in a layer of the first light guide element, for instance in case a sol-gel optical layer is applied (see also below).

As indicated above, in embodiments the stack comprises the first layer element or the second layer element or both the first layer element and the second layer element. Therefore, in embodiments the layer stack at least comprises the second layer element. In embodiments, the second layer element may have one or more functionalities selected from the group consisting of (a) reflective for UV radiation, (b) adhesive for adhering the layer stack to an object, (c) reinforcing the layer stack, and (d) protective for the first silicone layer. The first layer element may comprise a (sub) stack of layers and/or the second layer element may comprise a (sub) stack of layers. When the first layer element comprises a stack of layers, this stack can be indicated as sub stack, as it is part of the layer stack. Likewise, when the second layer element comprises a stack of layers, this stack can be indicated as sub stack, as it is part of the layer stack.

For obtaining reflective properties, different mechanisms may be chosen. The reflectiveness for UV radiation may be provided by a reflective layer that is based on e.g. an aluminum coating. Also other reflective or scattering material may be applied.

Alternatively or additionally, the reflectiveness for UV radiation may be provided by a layer that imposed total internal reflection on the light guide. For instance, a layer having a smaller index of refraction at the light guide face may force a part of the light back into the light guide due to total internal reflection in the light guide. Hence, when using total internal reflection, the index of refraction of the layer at the light guide face may essentially be smaller than the index of refraction of the light guide material. For instance, the index of refraction of the material of an (optical) layer comprised by the second layer element, especially such layer being in physical contact with the second light guide face, is at least 0.02, such as at least 0.04 smaller than the index of refraction of the light guide (material).

Hence, in embodiments the second layer element comprises one or more of (i) an aluminum layer, (ii) a silicone layer comprising a particulate reflective material, and (iii) a polymeric layer comprising a particulate reflective material. Such polymeric or silicone layer is especially also essentially non-absorbing, but may comprise scattering material, like e.g. particles of BN, $Al_2O_3$, $BaSO_4$, MgO, PTFE (polytetrafluoroethylene), etc. Weight averaged particle sizes may e.g. be in the range of 5-400 nm, more specifically in the range of 50-200 nm. Further, in embodiments, the scattering material may be available with an amount in the range of 0.001-1 vol. %, such as in the range of 0.001-0.1 vol. %. Such silicone layer will in general also have another composition than the first silicone layer. As indicated above, this difference may be in one or more of side groups (e.g. methyl), additives, etc. Therefore, in specific embodiments the second layer element comprises a layer comprising one or more of siloxane and polymeric material with particulate reflective material embedded therein. Especially, the layer comprises one or more of a siloxane and a fluoropolymer. In embodiments, the particulate material comprises boron nitride. Therefore, in specific embodiments the layer in the second layer element comprises a silicone with particulate material, especially boron nitride (BN), therein. The particulate material is configured to scatter the UV radiation. As siloxane may more easily be functionalized than the fluoropolymer, in specific embodiments a silicone may be applied. Alternatively or additionally, the second layer element may comprise (iv) a polymeric layer having an index of refraction smaller than of the first silicone layer. Especially, such polymeric layer (having an index of refraction smaller than of the first silicone layer) may comprise a fluoropolymer (such as described elsewhere herein). As indicated also elsewhere, the index of refraction may be at least 0.02, such as at least 0.04 smaller than the index of refraction of the first silicone layer.

In embodiments, the polymeric material comprises one or more of fluorinated ethylene, fluorinated propylene, fluorinated ethylene propylene, and fluorinated propylene acetate. Such material(s) may—in embodiments—be used without particulate material, as the index of refraction may be lower than of silicone. Therefore, a layer comprising a fluoropolymer may also be used as reflective layer (see also above). Such layer may promote internal reflection it the first silicone layer.

As indicated above, also an aluminum layer may be used as reflective layer. As the second layer element in its entirety does not need to be transmissive, as this second layer element may be used to attach to a surface of an object, this layer may essentially be thicker than when an aluminum layer is applied in the first layer element. Hence, the aluminum layer may also be used for (further) reinforcement of the stack. In embodiments, the second layer element comprises an aluminum layer having a thickness selected from the range of at least 50 nm, such as at least 90 nm, such as at least 100 nm, like at least 120 nm, such as at least 200 nm. With too small thicknesses, the layer may be partly transmissive, with thicknesses of ≥50 nm, such as ≥90 nm, even more especially at least 100 nm, the layer may be mainly or essentially only reflective. One side of the aluminum layer may be directed to the first (silicone layer); another side of the aluminum layer may be in contact with another layer, such as a silicone layer or a polymeric layer, without necessarily specific UV-transparent or reflective properties, especially a polymeric layer, such as for instance a fluoropolymer, but also other polymers may be used. A fluoropolymer may, however, especially be useful in embodiments wherein the aluminum layer is patterned.

Further, the second layer element may especially be used for providing adhesiveness for the light guide element. As e.g. silicone light guides may not easily adhere to objects, such as a hull of a vessel, an adhesive layer may be provided. Hence, in specific embodiments the second layer element comprises one or more second layer element layers having one or more functionalities selected from the group consisting of (a) reflective for UV radiation, and (b) adhesive for adhering the light guide to an object. In embodiments, the second layer element may comprise a first reflective layer configured in contact with the second light guide face, and a first adhesive layer configured as outer layer of the second layer element.

Further, a single layer may provide more than one functionality. This may apply for both the first layer element and the second layer element.

For instance, in specific embodiments the invention also provides an adhesive layer, especially such layer being in physical contact with the second light guide face, which comprises material that is in principle transmissive for UV radiation, but which has a smaller index of refraction than the light guide material, especially at least 0.02, such as at least 0.04 smaller than the index of refraction of the light guide (material).

Therefore, in specific embodiments the light guide element comprises both the first layer element and the second layer element, wherein both layer elements comprise a layer having an index of refraction lower than the light guide.

As indicated above, a layer may be used which is especially transmissive for the radiation of interest, such as the UV radiation, but which has an index of refraction lower than of the first (silicone) layer. Such layer may be used in the first layer element. Alternatively or additionally, such layer may be used in the second layer element. Hence, below some further aspects in relation to such combination of the first (silicone layer) and an adjacent radiation transmissive layer are elucidated.

As indicated above, the first layer may also be indicated as light guide layer or waveguide layer or waveguide, etc. The light guide may especially have a plate-like shape. The plate-like shape may in embodiments be curved in one or two directions, or may be curvable in one or two directions, such as may be the case with silicones. Especially, the light guide has a height substantially smaller than a length or a width, such as at least 5 smaller, even more especially at least 10 times smaller. At least one of the faces (of the two faces defining the height of the light guide), or at least part of such first light guide face (herein also indicated as "first surface"), may be used as light outcoupling face. This face is herein also indicated as first light guide face. UV radiation may escape from this face. Some escape is desired in view of the anti-biofouling function of the radiation, but too much radiation may escape or escape at the wrong parts of the first light guide face.

To this end, the invention provides in embodiments an optical layer which is in contact with at least part of the first light guide face. This optical layer has an index of refraction smaller than water, especially for UV radiation used by a light source used in combination with the light guide (see further also below). The optical layer is in optical and/or physical contact with at least part of the light guide. Especially, the optical layer is in physical contact with at least part of the first light guide face.

In embodiments, the index of refraction of the optical layer is at least 2% smaller, such as at least 5% smaller, than the index of refraction of seawater. In embodiments the optical layer has a first index of refraction (n1) smaller than 1.36 at 280 nm. At 280 nm the index of refraction of water, including seawater is equal to or higher than 1.36. Hence, the index of refraction of the optical layer should be smaller than this value, such as at least with the above indicated 5%. Therefore, in more specific embodiments the first index of refraction (n1) is equal to or smaller than 1.35 at 280 nm, such as equal to or smaller than 1.34 at 280 nm, like equal to or smaller than 1.30 at 280 nm, such as especially equal to or smaller than 1.25 at 280 nm, like equal to or smaller than about 1.22 at 280 nm. Especially, the first index of refraction of the optical layer may be at least about 1 (at 280 nm), such as at least about 1.10 (at 280 nm), like at least about 1.15 (at 280 nm). In specific embodiments, the index of refraction of the optical layer is at least 0.02, such as at least 0.04 smaller than the index of refraction of the light guide (material).

Such optical layer may comprise, or essentially consist, of a fluropolymer. The choice for the definition of the index of refraction at 280 nm does not mean that the light source used for providing anti-biofouling light necessarily provides radiation at 280 nm, or provides such radiation having a dominant wavelength at 280 nm. This wavelength is only chosen for the sake of definition. For instance, when 200 nm or 300 nm would be used, the index of refraction at those wavelengths of the optical layer is especially smaller than 1.39 or 1.35, respectively.

The index of refraction herein used is especially measured at atmospheric pressure and 25° C. For water reference values, it is referred to George M. Hale et al., Applied Optics, 1973, Vol. 12, No. 3, p. 555-563, which is herein incorporated by reference.

Especially, the optical layer has a first index of refraction (n1) smaller, especially at least 2% smaller, such as at least 5% smaller, than the index of refraction of water at 25° C. (and atmospheric pressure), such as in the range of about 80-98% of the index of refraction of water at 25° C. (and atmospheric pressure), like in the range of about 85-95%. The index or indices of refraction of water herein indicated may especially be related to demineralized water. Of course, this does certainly not apply that the invention is to be applied in demineralized water. Only the index of refraction of the optical layer may be defined in relation to demineralized water, such as the index of refraction of the optical layer being at least 2% lower than the index of refraction of (demineralized) water (at 25° C. and at atmospheric pressure). The index of refraction of the optical layer and of water are (thus) especially evaluated under substantially identical conditions (such as 25° C. and atmospheric pressure). For water, reference values may be used as e.g. defined by Hale et al. (see above). The above-indicated values for the refractive index of the optical layer may imply that the optical layer material has such index of refraction. However, as will be elucidated below when introducing porosity in the optical layer, the optical layer material may also have a (slightly) larger refractive index. The optical layer as such has the index of refraction lower than water and/or an index of refraction lower than 1.36 at 280 nm. The chemical composition of the UV radiation transmissive optical layer material and/or the morphology of the optical layer are especially different from the chemical composition of the light guide material and/or the morphology of the light guide. Hence, especially there is a (clear) interface between the light guide and the optical layer.

The optical layer may especially be used to extend the angles of incidence at which light is kept in the light guide. Note that e.g. a light guide made of silicone, but without optical layer, when being submerged in water may show some TIR, though substantially only at very shallow angles (since the difference of refractive index between water and silicones is so small). Adding the optical layer on top of the silicone (or other material) with a refractive index lower than water will increase the 'range of angles' that will actually reflect according to TIR. Hence, more light will stay inside the light guide.

The optical layer may be configured over the entire first light guide face but may in other embodiments also be available on only part of the first light guide face. Further, the optical layer may be provided with different thicknesses on different parts of the first light guide face. In this way the positions(s) where (more) UV radiation has to be reflected back into the light guide can be obtained by providing the layer and the position(s) where (less) UV radiation has to be reflected back into the light guide can be obtained by providing no layer. In this way, but also in other ways, a patterned layer may be provided, especially for promoting an evenly distribution of the light source light escaping from the first light guide face. Therefore, in embodiments the optical layer is a patterned optical layer with one or more first regions comprising said optical layer material with a first layer thickness (h1) and one or more second regions comprising said optical layer material with a second layer thickness (h2) in the range of $0 \leq h2 < h1$. With h2=0, there is no optical layer. The thickness of the first layer is especially at least 100 nm, even more especially at least 200 nm, yet even more especially at least 300 nm, such as at least 400 nm, like in the range of 400 nm-20 µm, like 1-15 µm, like 2-10 µm. However, thicker layers may also be possible, such as even up to about 2 mm, like up to about 1 mm (and especially at least 200 nm, such as at least 300 nm). With such thickness, UV radiation may be transmitted through the optical layer, especially when one or more of the herein mentioned materials are used. Hence, the optical layer may be chosen such, that the herein indicated transmission may be obtained. This is known to a person skilled in the art.

As indicated above, the optical layer material may especially have a low index of refraction, such as lower than water.

The optical layer may include pores. The term "pore" may also refer to "cavity". Such pores may contain a gas, such as a noble gas, $CO_2$, or air. By such porous structure, the refractive index of the optical layer may also be relatively low.

Especially, the pores are pores that enclose the gas. For instance, during production of the optical layer, gas may be captured in the layer, thereby providing an optical layer with a kind of porous structure, though such pores may not be accessible from external. Alternatively or additionally, in embodiments the pores may be accessible from external, but this access has substantially been blocked with a layer, such as a water resistant layer or a water impermeable layer.

Alternatively or additionally, the pores may be accessible from external by a gas, but the pores may have such dimensions, optionally in combination with a water repellent material in the pores (or of the porous material), that water does not substantially accesses the pores.

In embodiments, the optical layer is a porous optical layer having a porosity in the range of 5-70%, such as 10-50%. The porosity may e.g. be determined by using the volume of the layer, the volumetric mass density known for the optical layer material, and the weight of the layer. Based thereon, the porosity can be determined, as the occupied volume is larger than the theoretical volume based on weight and assuming no porosity. In specific embodiments, the dimensions of the pores are smaller than about 300 nm, such as smaller than about 200 nm. In specific embodiments, the dimensions may be smaller than the dominant wavelength of the radiation of the light source which may be used in combination with the light guide element.

In embodiments, the optical layer material comprises a sol-gel material. Methods for making sol-gel layers or porous layers are known in the art, and are e.g. described in WO2012/125271, US2011/0111203, U.S. Pat. No. 4,271, 210, Guangming Wu et al., Materials Science Engineering B78, 135-139, which are herein incorporated by reference.

Hence, in embodiments the low refractive material is a micro-porous material. The material may in embodiments be produced through sol-gel routes from e.g.

MTMS/TEOS (methyl trimethoxy silane/tetra ethoxy silane)), where the micro-porosity may be achieved by using a soap (e.g. polyethyleneoxide). Micro pores in the sol gel have dimensions smaller that the wavelengths of the UV light and that prevents high losses due to scattering. The low refractive materials can be applied as a thin layer. Such a low refractive layer increases the angle of total reflection, and thereby reduces the out coupling. The optical layer may in embodiments comprise one or more of an aluminate and a silicate.

The term "optical layer" may also refer to a plurality of (different) optical layers configured as stack and providing an optical layer stack (which may herein also be indicated as "first optical layer stack" or "first layer stack" or "stack" or "first stack"). Such optical layer stack is herein simply indicated as "optical layer". Hence, in embodiments the first layer element may include a single layer or a plurality of layers that are stacked.

As indicated above, the first layer element comprises chemical links with the first silicone layer and/or the second layer comprises chemical links with the first silicone layer.

Especially, the chemical binding comprises one or more of an amide binding, an ester binding, an ether binding, and a Si—O—Al binding. To this end, the first silicone layer, a polymer layer, an aluminum layer, or an intermediate layer may include functional groups that, when the different materials are brought into contact with each other, provide a chemical binding between the materials. This will be further elucidated below. Optionally, between e.g. a polymeric layer or an aluminum layer, there may be an intermediate layer. This may be a fluoropolymer, but especially a silicone (see also above). Hence, in embodiments the one or more of the first intermediate layer and the second intermediate layer comprises a (second) silicone layer having a composition different from the first silicone layer.

In embodiments of the layer stack, the first layer element comprises a polymeric layer comprising a fluoropolymer, such as FEP, and the second layer element comprises one or more of an aluminum layer and a polymeric layer. In embodiments, the second layer element comprises an aluminum layer or a fluoropolymer layer or a polyimide layer. Especially, the this layer is associated to the first silicone layer by a chemical binding.

Hence, in embodiments, the second layer element may comprise an aluminum layer. Especially, in such embodiments the second layer element further comprises a polymeric layer, such as a fluoropolymer or a polyimide.

Alternatively, in embodiments, the second layer element may comprise (only) a polymeric layer, such as a fluoropolymer layer. Especially, such layer has an index of refraction smaller than the first silicone layer, limits intrusion and permeation of water, and may optionally be adhesive.

Alternatively, in embodiments, the second layer element may comprise (only) a polyimide layer. Especially, such layer has an index of refraction smaller than the first silicone layer, limits intrusion and permeation of water, and may optionally be adhesive.

In embodiments, the second layer element comprises an aluminum layer and a polymeric layer, wherein the former is configured closer to the first silicone layer than the latter. In specfic embodiments, the former is associated to the first silicone layer. The polymeric layer may be used as protective film. The polymeric layer may in embodiments comprise one or more of a fluoropolymer, such as FEP, and a polyimide.

In embodiments, the second layer element comprises a stack of (i) a polymeric layer comprising a fluoropolymer, (ii) an aluminum layer, and (iii) a polymeric layer (such as one or more of a fluoropolymer, such as FEP, and a polyimide).

In embodiments, the polyimide described herein, especially for the second layer element, may comprise poly (4,4'-oxydiphenylene-pyromellitimide).

The aluminum layer which is available in embodiments of the second layer element may be patterned.

In addition to the layers described above, in embodiments the second layer element may also include an anti-corrosion paint. From the layers in the layer stack, this layer will be configured most remote of the first silicone layer.

During use, the layer of the second layer stack most remote of the first silicone layer may be in physical contact with the object, such as a hull, like a steel hull. The object may include a surface with an anti-corrosion paint. In such embodiments, the second layer stack (which may then not comprise an anti-corrosion paint) may be in physical contact with the anti-corrosion paint.

The first layer element may (only) comprise a fluoropolymer, such as FEP. The first layer element may have one or more properties selected from the group of (i) having a refraction index lower than of the first silicone layer (to create TIR), (ii) being transmissive for UVC, (iii) being resistant to UV, (iv) limiting intrusion of chemical components, (v) being stronger than silicone.

The first silicone layer especially (i) has a high transparency for UVC (65%-90%/cm in the bulk), and/or (ii) is resistant to UV. The phrase "UVC transmission of 65%/cm in the bulk" and similar phrases especially refer to the internal transmission.

In embodiments, a first layer of the second layer element directly adjacent to the first silicone layer may have one or more properties selected from the group of (i) refraction index lower than the index of refraction of the first silicone layer (to create TIR), (ii) transmissive for UVC, and (iii) resistant to UV. Such first layer of the second layer element may be a fluoropolymer, such as FEP. A second layer of the second layer element, directly adjacent to such first layer (and thus configured more remote from the first silicone layer than the first layer of the second layer element) may have one or more properties selected form the group of (i) limiting intrusion and permeation of chemical components, and (ii) having a UVC reflection ≥50%. Such second layer of the second layer element may be an aluminum layer, which may optionally be patterned. A third layer of the second layer element, directly adjacent to such second layer (and thus configured more remote from the first silicone layer than the second layer) may have one or more properties selected form the group of (i) limiting intrusion and permeation of water (e.g. to protect an aluminum layer, and (ii) being adhesive. Such third layer may comprise one or more of a fluropolymer and a poliymide.

In embodiments, a first layer of the second layer element directly adjacent to the first silicone layer may have a UVC reflection >50%. Such first layer of the second layer element may be an aluminum layer, which may optionally be patterned. A second layer of the second layer element, directly adjacent to such first layer (and thus configured more remote from the first silicone layer than the first layer of the second layer element) may have one or more properties selected form the group of (i)) limiting intrusion and permeation of chemical components, and (ii) being adhesive. Such second layer of the second layer element may comprise one or more of a fluropolymer and a poliymide.

The layer stack especially has a large aspect ratio, such as larger than 10, even more especially at least 100, i.e. the length and/or width (especially both) is at least 10 times larger than the thickness.

The layer stack may especially be used for anti-biofouling purposes. Hence, in specific embodiments the layer stack further comprises one or more, especially a plurality of, solid state light sources embedded in the first silicone layer.

As indicated above, the light guide in combination with a light source may especially be used to provide anti-biofouling light to surfaces that foul, such as ship hulls. Even more especially, as will also be further elucidated below, the light guide element may be used as a skin on an object, such as a vessel. Whereas the external face ("fouling surface") of the object, such as a ship hull, may be subject to biofouling, when the light guide element is used as skin on such object, the fouling surface is translated to the first light guide face (including additional layer) provided by the light guide element provides. Hence, for at least part of the object, the light guide element may become its outer surface (and thus potentially be subject to fouling).

Therefore, in yet a further aspect the invention also provides an anti-biofouling system ("system") comprising the light guide element as described herein and a light source, wherein the light source is configured to provide said UV radiation into the light guide, and wherein the anti-biofouling system is configured to provide at least part of said UV radiation downstream from the first light guide face (and optionally downstream from the optical layer). Hence, the UV radiation is coupled out from the light guide through at least part of the first light guide face, and is thus provided downstream from the first light guide face (and optionally downstream from the optical layer). Especially, the invention provides an anti-biofouling system comprising the light guide element as described herein and a light source, wherein the anti-biofouling system comprises a radiation exit window comprising said first light guide face, wherein the light source is configured to provide said UV radiation into the light guide, and wherein the radiation exit window is configured to transmit at least part of said UV radiation. The radiation exit window may thus in embodiments also comprise the first layer element. In specific embodiments, the light source comprises a light emitting face, wherein the light emitting face is configured within the light guide. For instance, one or more solid state light sources may be embedded in the light guide. Essentially, the entire solid state light source may be embedded in the light guide (material).

The light source especially comprises a solid state light source, such as a LED. The combination of light guide and light source are herein also indicated as UV-emitting element.

In embodiments, the light source is configured external from the light guide. In such embodiments, the light source is configured to provide the light source light to a face of the light guide, whereby light of the light source is coupled into the light guide (such as via an edge face of the light guide). The light source and the light guide are especially radiationally coupled. The term "radiationally coupled" especially means that the light source and the light guide are associated with each other so that at least part of the radiation emitted by the light source is received by the light guide (and at least partly escapes from the light guide).

In yet other embodiments, the light source comprises a light emitting face, wherein the light emitting face is configured within the light guide. For instance, a LED may be embedded in silicone. Examples of the latter embodiment are e.g. described in WO2014/188347 which is herein incorporated by reference. Of course, different embodiments may be combined.

In yet a further aspect, the invention also provides an object comprising a surface, such as an external surface, wherein the layer stack according to any one of the preceding claims is attached to at least part of the surface. Especially, in an aspect the invention provides an object that during use is at least partly submerged in water, the object comprising the anti-biofouling system as defined herein, wherein the UV-emitting element is configured to irradiate with UV radiation during an irradiation stage one or more of (i) a part of a surface, such as an external surface, of said object and (ii) water adjacent to said part of said external surface. As indicated herein, the object may especially be selected from the group consisting of a vessel and an infrastructural object, but also other objects. The phrase "during use is at least partly submerged in water may refer to fresh water or sea water or a mixture thereof (brackish water). Hence, the invention may amongst others be used for aquatic applications, such as marine applications.

In embodiments, light guide element comprises the second layer element in contact with the second light guide face, wherein the second layer element comprises a first adhesive layer in contact with the external surface (of the object).

Herein, the phrase "object that during use is at least partly submerged in water" especially refers to objects such as vessels and infrastructural objects that have aquatic applications. Hence, during use such object will be in general in contact with the water, like a vessel in the sea, a lake, a canal, a river, or another waterway, etc.

The term "vessel" may e.g. refer to e.g. a boat or a ship, etc., such as a sail boat, a tanker, a cruise ship, a yacht, a ferry, a submarine, etc. etc.

The term "infrastructural object" may especially refer to aquatic applications that are in general arranged substantially stationary, such as a dam, a sluice, a pontoon, an oilrig, etc. etc. The term "infrastructural object" may also refer pipes (for e.g. pumping up ocean water to e.g. a power plant), and other parts of (hydro-electrical) power plants, such as cooling systems, turbines, etc.

The term "object" may in embodiments refer to a support structure for a sea-going or a sea-based wind turbine, an oil rig, a structure for harvesting wave/tidal energy, a floating device, etc. The term "external surface" especially refers to the surface that may be in physical contact with water. In the case of pipes this may apply to one or more of the internal pipe surface and the external pipe surface. Hence, instead of the term "external surface" also the term "fouling surface" may be applied. Further, in such embodiments the term "water line" may also refer to e.g. filling level.

Especially, the object is an object configured for marine applications, i.e. application in or near to a sea or an ocean. Such objects are during their use at least temporarily, or substantially always, at least partly in contact with the water. The object may be at least partly below the water (line) during use, or may substantially be all of its time below the water (line), such as for submarine applications. The invention may e.g. be applied for marine anti-fouling, keeping wetted surfaces clean, for off-shore applications, for (sub) sea applications, for drilling platforms, etc.

Due to this contact with the water, biofouling may occur, with the above indicated disadvantages. Biofouling will occur at the surface of a surface ("surface), such as an external surface, of such object. The surface of an (element of the) object to be protected may comprise steel, but may optionally also comprise another material, such as e.g. selected from the group consisting of wood, polyester, composite, aluminium, rubber, hypalon, PVC, glass fiber, etc. Hence, instead of a steel hull, the hull may also be a PVC hull or a polyester hull, etc. Instead of steel, also another iron material, such as an (other) iron alloys may be used Herein, the term "fouling" or "biofouling" or "biological fouling" are interchangeably used. Above, some examples of fouling are provided. Biofouling may occur on any surface in water, or close to water and being temporarily exposed to water (or another electrically conductive aqueous liquid). On such surface biofouling may occur when the element is in, or near water, such as (just) above the water line (like e.g. due to splashing water, such as for instance due to a bow wave). Between the tropics, biofouling may occur within hours. Even at moderate temperatures, the first (stages of) fouling will occur within hours; as a first (molecular) level of sugars and bacteria.

The anti-biofouling system comprises at least an UV-emitting element. Further, the anti-biofouling system may comprise a control system (see also below), an electrical energy supply, etc.

The term "anti-biofouling system" may also refer to a plurality of such systems, optionally functionally coupled to each other, such as e.g. controlled via a single control system. Further, the anti-biofouling system may comprise a plurality of such UV-emitting elements. Herein, the term "UV-emitting element" may (thus) refer to a plurality of UV-emitting elements. For instance, in an embodiment a plurality of UV-emitting elements may be associated to a surface, such as an external surface, of the object, such as a hull, or may be comprised by such surface (see also below), whereas e.g. a control system may be configured somewhere within the object, such as in a control room or wheel house of a vessel.

The surface or area on which fouling may be generated is herein also indicated as fouling surface. It may e.g. be the hull of a ship and/or an emission surface of an optical medium (see also below). To this end, the UV-emitting element provides UV radiation (anti-fouling light) that is applied to prevent formation of biofouling and/or to remove biofouling. This UV radiation (anti-fouling light) especially at least comprises UV radiation (also indicated as "UV light"). Hence, the UV-emitting element is especially configured to provide UV radiation. Thereto, the UV-emitting element comprises a light source. The term "light source" may also relate to a plurality of light sources, such as 2-2000, like 2-200 (solid state) light sources, such as LEDs, though many more light sources may also be applied. Hence, the term LED may also refer to a plurality of LEDs. Especially, the UV-emitting element may comprise a plurality of light sources. Hence, as indicated above, the UV-emitting element comprises one or more (solid state) state light sources. The LEDs may be (OLEDs or) solid state LEDs (or a combination of these LEDs). Especially, the light source comprises solid state LEDs. Hence, especially, the light source comprises a UV LED configured to provide one or more of UVA and UVC light (see also below). UVA may be used to impair cell walls, whereas UVC may be used to impair DNA. Hence, the light source is especially configured to provide the UV radiation. Herein, the term "light source" especially refers to a solid state light source. The light source(s) may also include (a) solid state laser(s). The term "light source" may also refer to a light source including optics, such as a solid state light source with one or more beam shaping elements selected from the group of a lens and a reflector (such as a collimator).

The solid state light source, such as a LED, may be a top-emitter or a side emitter.

Especially, the light source or the light sources is (are) LEDs. Hence, in embodiments the anti-biofouling system comprises a plurality of light sources, wherein the light sources comprise LEDs. Alternatively or additionally, the light sources comprise solid state lasers.

As indicated above, the UV-emitting element is especially configured to irradiate with said UV radiation (during an irradiation stage) one or more of (i) said part of said external surface and (ii) water adjacent to said part of said external surface. The term "part" refers to part of the external surface of an object, such as e.g. a hull or a sluice (door). However the term "part" may also refer to substantially the entire external surface, such as the external surface of the hull or sluice. Especially, the external surface may comprise a plurality of parts, which may be irradiated with the UV light of one or more light sources, or which may be irradiated with the UV radiation of one or more UV-emitting elements. Each UV-emitting element may irradiate one or more parts. Further, there may optionally be parts that receive UV radiation of two or more UV-emitting elements.

In an embodiment the UV-emitting element comprises a two-dimensional grid of light sources for generating UV radiation and the optical medium is arranged to distribute at least part of the UV radiation from the two-dimensional grid of light sources across the optical medium so as to provide a two-dimensional distribution of UV radiation exiting the light emitting surface of the light module. The two-dimensional grid of light sources may be arranged in a chicken-wire structure, a close-packed structure, a rows/columns structure, or any other suitable regular or irregular structure. The physical distance between neigboring light sources in the grid may be fixed across the grid or may vary, for example as a function of light output power required to provide the anti-fouling effect or as function of the location of the UV-emitting element on the protected surface (e.g location on the hull of a ship). Advantages of providing a two-dimensional grid of light sources include that the UV radiation may be generated close to the areas to be protected with UV radiation illumination, and that it reduces losses in the optical medium or light guide and that it is increasing homogeneity of the light distribution. Preferably, the UV radiation is generally homogeneously distributed across the emission surface; this reduces or even prevents under-illuminated areas, where fouling may otherwise take place, while at the same time reducing or preventing energy waste by over-illumination of other areas with more light than needed for anti-fouling. In an embodiment, the grid is comprised in the optical medium. In yet another embodiment, the grid may be comprised by a (silicone) foil.

Further, in an embodiment the optical medium may be disposed proximate (including optionally attached to) to the protected surface and coupled to receive the ultraviolet light, wherein the optical medium has a thickness direction perpendicular to the protected surface, wherein two orthogonal directions of the optical medium orthogonal to the thickness direction are parallel to the protected surface, wherein the optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

In a further aspect, the invention also provides a method of anti-(bio)fouling (a part of) a surface, such as an external surface, of an object that is during use at least temporarily exposed to water, the method comprising: providing the anti-biofouling system as defined herein to the object, generating the UV radiation (during use of the object), optionally as function of one or more of (i) a feedback signal, and (ii) a timer for (periodically) varying the intensity of the UV radiation (anti-fouling light), and providing said UV radiation (during an irradiation stage) to (the part of) the external surface. Such feedback signal may be provided by the sensor.

Below, the method for providing the layer stack is further elucidated. As indicated above, in a further aspect the invention also provides such method which may be used to provide the stack as described herein. Hence, in an aspect the invention also provides a layer stack as obtainable with the herein described method.

Especially, the invention provides a method for providing a layer stack, the method comprising binding (i) a first silicone layer and (ii) one or more of a first layer element and a second layer element, by one or more of (a) associating by a chemical binding a first surface of the silicone layer and the first layer element directly, or via a first intermediate layer, and (b) associating by a chemical binding a second surface of the silicone layer and the second layer element directly, or via a second intermediate layer.

The phrase "binding a first silicone layer and a layer element" and similar phrases may imply that former is bound to the latter, or the latter is bound to the former. Further, such phrase and similar phrases may imply that e.g. the silicone layer is bound to a layer stack, but may also imply that a layer is provided to the first (silicone) layer as first layer element, and then one or more further layers are provided on such layer to provide a layer element comprising a stack.

To bind one layer to the other with chemical bindings, it may be necessary to functionalize one or both layers, or a material that is to provide one of the layers, may be functionalized. The layer, or material that is to provide one of the layers, may also be functionalized per se. For instance, silicone adhesive is not fully reacted or hardened and may include groups that can be used for forming chemical bindings with another layer. For instance, the silicone may include vinyl groups and/or hydride groups, which may further react or be functionalized.

Especially, herein one or more of —OH groups, —COOH groups, —$NH_2$ groups, and —Si—H groups may be used for creating interlayer chemical bindings. Such groups may thus be available or may be created by functionalizing.

Therefore, in embodiments the method may (further) comprise providing the binding between at least two functionalized materials, of which one or more are provided by the first surface functionalized with functional groups and/or the second surface functionalized with functional groups, wherein the functional groups comprise one or more selected from the group consisting of an —OH group, a —COOH group, a —$NH_2$ group, and a —Si—H group. Especially, such groups may be used for forming chemical bindings comprising one or more of amide bindings, ester bindings, ether bindings, and Si—O—Al bindings.

Different options can be distinguished for creating a chemical bond between the wave guide and protecting material are possible. For instance, in embodiments a finished silicone wave guide can be coupled via interface chemistry to a finished protective material layer. In other embodiments, a liquid silicone (wave guide) material can be coupled to a finished protective material layer via interface chemistry. In yet other embodiments, a liquid silicone (wave guide) material may be coupled to a non-finished protective material layer via interface chemistry.

As indicated above, fluoropolymers may be desirable as support for an aluminum layer, as optical layer in view of the low index of refraction, or reflective layer by using scattering material. However, fluoropolymer materials are relatively difficult to activate for coupling via interface chemistry.

In embodiments, one may partly remove fluorine groups and replace with a suitable functional group. In embodiments, an oxidative replacement with e.g. carboxyl groups may be possible, such as by using FluoroEtch (Sodium Naphthalenide) solution. It is observed that the longer the etch time or temperature, the more browning occurs which leads to increased UV-C absorption. Shorter etching, or a lower etching temperature, or post-oxidation of the etched sheet can be used to prevent this.

For improving binding between the polymer and the silicone or intermediate layer, one may use the carbonyl groups, or replace the carbonyl groups with more active functional groups, such as a more reactive carboxyl group. For instance via EDC-NHS chemistry, a highly reactive group can be formed, which can be used to couple with an $NH_2$ group of another layer or material. In this way, a relatively hydrolytically stable amide bonds may be created. EDC is used to indicate (1-ethyl-3-(3-dimethylaminopropyl) carbodiimide hydrochloride). NHS is used to indicate N-hydroxysuccinimide. The use of EDC-NHS for coupling is e.g. described in "Room-temperature intermediate layer bonding for microfluidic devices", by Jacob Bart et al., Lab Chip, 2009, 9, 3481-3488, which is herein incorporated by reference. Therefore, in embodiments the method may further comprise generating the chemical bindings via an EDC-NHS assisted reaction.

Hence, to come e.g. to a chemical binding between two layers, or between a layer and a material that is to form a layer, the use of carboxyl groups and/or EDC-NHS may be applied, in combination with the use of amine groups, respectively. For instance, this may imply a combination of activation process of fluorocarbon polymers, increasing of the reactivity of the carboxylic acids created in order to allow fast reaction with $NH_2$ groups on the other surface (such as especially silicone, which is also not regularly functionalized with $NH_2$ groups, and for which a separate activation, for example plasma activation, process has to be executed). For instance, the silicone can be functionalized via an $NH_3$-plasma process. It is also possible to functionalize via APTES chemistry, which is also described in the above-mentioned paper of Jacob Bart et al. The term "APTES" is used to indicate (3-Aminopropyl)triethoxysilane.

Aluminum may be e.g. provided on a fluoropolymer layer, and may bind relatively well to such layer. However, for binding of the aluminum and the silicone, some additional steps may have to be taken.

Aluminum can be activated (by $H_3PO_4$ acid or $O_2$ plasma) to form hydroxyl groups, which subsequently have to be reacted with a chemical that can form hydrolytically stable bonds. Silanes are well known to form Al—O—Si bonds which are very stable. The benefit of silanes is that the silane itself can be modified with either $NH_2$ groups, vinyl groups or practically any other group that can again form a hydrolytically stable C—C bond or amine bond.

Commercial primers containing a mixture of silanes and Ti-complexes with vinyl groups have been shown to be very effective in activating the surface for adhesion with the silicone, however the UV-C absorption is significant for a thin layer of <1 μm (>30%). Alternatively or additionally, a (R1)(R2)(R3)M primer may be used. It appears that such primers are very suitable, and may be used without the additional silanes to provide the desired binding. In view of controllability of the UV transmission and/or stability, this may be desirable. The UV-C absorption is substantially lower when using such primer.

Therefore, in embodiments the method may further comprise generating an Al—O—Si chemical binding via a primer assisted reaction, wherein the primer is selected from the group consisting of (R1)(R2)(R3)M, wherein R1, R2 and R3 are each independently an alkoxy, and wherein M comprises group III metals, such as one or more of B, Al, Ga, In, but especially a suitable metal is Al. The use of Al may be desirable in view of reactivity but also as this use may lead to residual primer material that is relatively transmissive for UV radiation and/or does essentially not absorb UV radiation, which may not be the case with other suitable primers. For instance, the primer may comprise one or more of tri-sec butoxide, tri-n-butoxide, tert-butoxide, tri-n-propyloxide, tri-isopropyloxide, but also others may be possible, such as with different side groups. Especially good results were obtained in a method wherein the primer comprises one or more of $Al[OCH(CH_3)C_2H_5]_3$ and $Al[OC(CH_3)_3]_3$ Hence, in embodiments the invention may e.g. include providing an Al layer having a relatively small thickness, such as ≤20 nm). This may still allow using the activation process to provide and hydrolytically stable bonds. However, this may also provide the desired UV-C transparency of the layer.

Such (thin) Al layer may be deposited on a polymer, especially a fluoropolymer, such as even more especially a fluorinated ethylene propylene (FEP) layer. Using an Al layer instead of e.g. a fluoropolymer layer as reflective layer may have as advantage that functionalizing an Al layer may be easier than functionalizing a fluoropolymer layer.

As indicated above, instead of providing an integral Al layer, also Al islands may be deposited on the polymeric layer. The term "Al islands" may essentially refer to any non-continuous Al-layer with two or more domains that have no direct contact, especially a plurality of domains. The size (here especially defined as the equivalent circular diameter) of the Al domains can range from 0.01 to 5 mm, more specifically from 0.1 to 0.5 mm, and the number of Al domains per surface area should range from 1 to 10,000 per $cm^2$, whereas the surface area of the aluminum domains relative to the uncoated area should not exceed 10% in order to maintain the UV transparency of the integrated stack. The equivalent circular diameter (or ECD) of an irregularly shaped two-dimensional shape is the diameter of a circle of equivalent area. For instance, the equivalent circular diameter of a square with side a is $2*a*SQRT(1/\pi)$.

The Al layer may be thermally connected to the polymer, especially the fluoro polymer, such as FEP, during the (plasma assisted) chemical or physical vapor deposition process. Such Al layer may be bound to the silicone, either directly, as described above, or via a silicone gel as intermediate layer.

However, also a fluoropolymer may be used to bind to the first silicone layer. As indicated above, it is possible to anchor $NH_2$ groups on a fluoropolymer, such as a FEP layer instead of carboxylic acid groups. These may be allowed to react with e.g. activated carboxylic groups on the silicone surface.

Alternatively or additionally a silicone layer may be used to bind to the first silicone layer. Such silicone layer, or fluoropolymer layer may include reflective material, see also above. Alternative or additional to the materials mentioned above, boron nitride, which is relatively inert, can be incorporated in the matrix, such as the silicone matrix.

The above information about the method may essentially refer to a layer of both the first layer element and the second layer element. Further, as indicated above, it may also be necessary to activate the silicone, when an essentially fully reacted silicone is applied. Or course, also a liquid silicone may be applied, then the reactive groups thereof may (also) be applied (see also above).

Therefore, in embodiments it may be necessary to functionalize the silicone to provide one or more of an —OH group, a —COOH group, a —$NH_2$ group, and optionally a —Si—H group.

For instance, in embodiments side groups, such as especially methyl side groups of the silicone chains can be oxidized, e.g. by one or more of UV-ozone, $O_2$ plasma and a strong acid. In this way hydroxyl groups or carbonyl groups may be formed. As indicated above, these can be reacted to form e.g. ethers or esters.

Especially for hydrolytically stable amine bonds, $NH_2$ side groups may be generated. For instance, using plasma chemistry, the side chains can also be functionalized with NH2 groups that can react with e.g. (activated) carboxyl groups to form amines, see also the above-described EDC-NHS chemistry.

In specific embodiments, for backside blocking layer, aluminum could be directly evaporated onto the silicone material after activation, where the impermeability of the metal layer could prevent hydrolysis of the Al—O—C bonds formed in this process. In specific embodiments, islands of aluminum may be deposited, to increase adhesion to a next layer that will provide longer term protection, such as a fluoropolymer.

To obtain an Al layer, optionally in the form of a plurality of Al domains, on the first (silicone) layer, silicon side chains may be functionalized with NH2 chemistry in order to provide hydrolytically stable reaction points. Aluminum, such as a plurality of aluminum islands, may be deposited. Such aluminum layer may be used to promote adhesion and to circumvent issues with difference in thermal expansion coefficients, combined with surface activation of the Al to allow bonding of lower cost wet protection layer, like a 2K PUR potting material 'directly' to the silicone with molecular adhesion.

In specific embodiments, it may even be possible to co-react silicone and protective material when they are in liquid form. When the fluorocarbon pre-polymers and the silicone pre-polymers are joined together in liquid form, they can form interconnected molecular networks. Then, it may be desirable to separate the fluorocarbon and silicone in space, which might be possible in a dual layer injection molding like setup, or even be possible based on the differing surface tensions of the fluoro-polymer and the silicone polymer. In embodiments, one may use surface tension differences to separate different liquids. Further, one may apply a Pt catalyzed vinyl polymerization. This may require modification of perfluoro compounds with vinyl functionality. Hence, in embodiments the method may further comprise contacting a non-fully hardened silicone layer to another layer, such as a polymeric layer (such as a fluoropolymer) comprising a functionalized aluminum coating, or a polymeric layer per se (such as a fluoropolymer).

If the curing chemistry is not perfectly tuned, intimate mechanical connection between the polymer chains could already lead to sufficient adhesion and chemical protection. Diffusion of multi-$NH_2$ modified silicone compounds could be a starting point, providing reaction points for acid functional perfluoro compounds, again forming and amide to hold these. One may use the available porosity in the silicone to diffuse both multi-$NH_2$ modified silicone compounds and acid fluoro compounds into the matrix As indicated above, in specific embodiments the layer stack is to be provided on an object, such as by way of example a ship. The backside of the waveguide may not suffer from the sea water environment or other undesirable conditions, as degradation of the backside of the waveguide also has effects on the outcoupling of UV-C on the front. Hence, the object side of the layer stack may need to adhere well to the object, such as ship. With the FEP layer this is again hard, with Aluminum it is possible to use a thin aluminum layer on a plastic carrier, such as for instance PET. Hence, in embodiments the method may thus further comprise providing the layer stack to at least part of a surface of an object. Such plastic carrier may more easily be attached to the surface of an object.

As indicated above, the first (silicone) layer may be used as waveguide layer, wherein one or more, especially a plurality of light sources are (at least partly) embedded. Therefore, in embodiments one or more, especially a plurality of solid state light sources are embedded in the first silicone layer. Layers may be provided to such first silicone layer.

In yet a further aspect, the invention also provides a method of providing an anti-biofouling system to an object, such as an object that during use is at least temporarily exposed to water, the method comprising providing, such as integrating in the object and/or attaching to a surface, such as an external surface, the anti-biofouling system to the object, such as a vessel. Especially, the UV-emitting element may be configured to provide said UV radiation to one or more of a part of a surface, such as an external surface, of the object and water (being) adjacent to said part (during use). Especially, the UV-emitting element is attached to the external surface, or may even be configured as (first) part of the external surface.

With the herein described invention, a surface may be treated such with anti-biofouling radiation that biofouling is reduced or prevented. Hence, in yet a further aspect the invention also provides a method of preventing and/or reducing biofouling at a surface of a light guide element associated to the external surface of the object as defined herein, the method comprising generating UV radiation and providing said UV radiation to the surface while at least part of the UV radiation escapes from the light guide element via the surface. In yet a further aspect, the invention provides a method of preventing and/or reducing biofouling at a surface, such as an external surface, of an object, the external surface during use of the object being at least temporarily exposed to water, the method comprising generating UV radiation by an anti-biofouling system (such as described herein) and providing said UV radiation to the external surface of the object and water adjacent to the external surface, wherein the anti-biofouling system comprises a light guide element as described herein. The light guide element can be used to provide the UV radiation to the surface of the object or the light guide element may provide the surface of the object. The term "associate" and similar terms may refer to a functional coupling of elements. For instance, the light guide element may be coated to an object or may be attached to an object such as with one or more of mechanical means, glue, an adhesive, etc. The term "associate" and similar terms in the context of a light source may also refer to e.g. a radiational coupling, in the sense that an element and a light source may be associated such that the element receives at least part of the light source radiation.

Additionally or alternatively (to a chemical binding), also thermal binding may be applied. Thermal binding may imply that the surface is deformed by the thermal energy of the vapor, making the vapor penetrate into the surface, which upon cooling constricts around the vapor. In this manner, e.g. "spikes" of Al may be formed in a PET surface as "anchors" for subsequent Al vapor. As soon as a closed layer of Al is formed, no more anchoring takes place.

As indicated above, the invention provides a system comprising a light source configured to generate light source radiation, wherein the light source radiation at least comprises UV radiation. The UV radiation may especially be used for anti-biofouling purposes. As the system may be used to neutralize bacteria and/or other microorganisms, or to prevent attachment of bacteria and/or microorganisms, the anti-biofouling system may in general also be indicated as "system" and in specific embodiments "anti-micro biological fouling system", or "hygiene system", etcetera. Herein, the system may further be indicated as "anti-biofouling system" or "system".

Especially, the system comprises a UV-emitting element. In embodiments, such UV emitting element may comprise a light source with a plurality of light emitting surfaces. In embodiments, such UV emitting element may comprise a plurality of light sources, such as configured in an array, such as e.g. to provide a relative broad beam of UV radiation. For instance, the UV emitting element may comprise a light emitting diode device comprising a plurality of nanowires or nano pyramids grown on a graphitic substrate, said nanowires or nano pyramids having a p-n or p-i-n junction, a first electrode in electrical contact with said graphitic substrate, a second electrode in contact with the top of at least a portion of said nanowires or nano pyramids optionally in the form of a light reflective layer, wherein said nanowires or nano pyramids comprise at least one group III-V compound semiconductor, such as e.g. described in WO2017009394A. Such UV emitting element may also comprise a waveguide, such as for distributing UV radiation over at least part of a surface of the waveguide. In all embodiments, the UV emitting element is configured to generate UV radiation during operation, though other radiation accompanying this UV radiation is not excluded herein. Some of these embodiments are described in more detail below.

As indicated above, the system may especially comprise a waveguide. One or more light sources external from the waveguide and/or one or more light sources embedded in the waveguide may provide the light source radiation to the waveguide. By total internal reflection, at least part of the light source radiation may be distributed over the waveguide and escape from a radiation exit window thereof. A waveguide may be comprised by a sheet-like light output device. Hence, in embodiments the system comprises a waveguide element arrangement, wherein the waveguide element arrangement comprises a waveguide element comprising a radiation exit window, wherein the waveguide element is (a) configured to receive the light source radiation, and (b) configured to radiate (in an operation mode) part of the light source radiation to the exterior of the waveguide element via the radiation exit window. Instead of the term "waveguide element" also the term UV-emitting element may be used. Especially, the waveguide element is configured to provide, during use of the system, UV radiation. The term "waveguide element" may especially refer to a waveguide and optionally other elements embedded therein, such as a light source.

In specific embodiments, the light source may be embedded in the waveguide element. Hence, a single light source with a single light emitting surface, a single light source with a plurality of light emitting surfaces (such as fiber tips of a plurality of fibers), or a plurality of light sources with a plurality of light emitting surfaces (such as a plurality of LEDs (with the LED dies being the light emitting surfaces) may be embedded in the waveguide element, i.e. especially embedded in the waveguide material, such as e.g. silicone.

Hence, the waveguide element especially comprises waveguide material. The light source(s) may be (at least partly) embedded in the waveguide material. Light source radiation may propagate through the waveguide material and escape from the waveguide material via the radiation exit window. Part of the waveguided UV light may be scattered inside the waveguide (e.g. by the silicone) and arrive the radiation exit window under angles steep enough to leave the waveguide (and enables anti fouling).

In yet a further aspect, the invention also provides a computer program product, when running on a computer which is functionally coupled to or comprised by the system as defined herein, is configured to control the light source. This may thus also imply that a plurality of light sources is controlled. In this way, the spatial distribution of the light source radiation, such as escaping from a light emissive surface may be controlled. Controlling may be done according to one or more of a sensor signal of a sensor, a timer, etc. Hence, the system may further comprise one or more sensors which may be configured to sense one or more of biofouling, temperature, contact of part of the system, such as especially the light emissive surface with water, human or animal proximity to the system, such as especially the light emissive surface, etc. etc.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system. The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems.

As indicated above, the anti-biofouling system comprises a UV-emitting element. The term "UV-emitting element" may also refer to a plurality of UV-emitting elements. Hence, the system may include a plurality of such elements. The system may include a source of electrical energy, but the system may (during use) also be functionally coupled with a source of electrical energy. In embodiments, each UV-emitting element may functionally be coupled with a source of energy. This allows a decentral powering of the UV-emitting elements. The source of energy is especially used for powering the light source(s).

Herein, the UV-emitting element can also be indicated as "lighting module". The UV-emitting element may be a plate-like module (herein also indicated as "optical medium"), with one or more relevant elements at least partly, or even entirely, embedded therein. Hence, in embodiments the UV-emitting element comprises light transmissive (solid) material, such as silicone, etc. However, the UV element may also include a housing enclosing at least partly, or even entirely, one or more relevant elements. The one or more relevant elements at least comprise the light source, which is configured to provide light source radiation, especially the UV radiation. The UV-emitting element may have a flat or a curved radiation exit window. The term "UV-emitting element" indicates that the element is especially configured to provide UV radiation during use of the element.

The waveguide element may be shaped as a plate, optionally a curved shape. However, the waveguide element may also have other shapes. This may depend e.g. from the application. For instance, when the object is a door knob, a tap knob, a toilet knob, a railing, a kitchen cutting board, or a medical device, the shape of the waveguide element may be or need to be different than a plate, and may have one or more curved faces.

As the waveguide element may be planar, the light sources may be configured such, that the optical axis is substantially parallel to a length axis of the waveguide element. This may facilitate distribution of the light source radiation over the waveguide. For instance, the light source may include a side emitting LED. Especially, the waveguide element may include a plurality of side emitting LEDs.

The UV-emitting element comprises a UV radiation exit window. The UV radiation exit window is configured to transmit at least part of the UV radiation of the light source. At least part of the UV radiation escapes via the radiation exit window to the exterior of the UV-emitting element. Hence, the exit window is transmissive for UV radiation. In general, the window will also be transmissive for visible light. As indicated above, and as will further be explained below, in embodiments the element may be a radiation transmissive plate. In such instance, the window may be a face (or plane) of the element.

The term "radiation transmissive" refers to transmissive for radiation, especially for UV radiation and optionally also for visible radiation.

The UV radiation exit window comprises an upstream window side and a downstream window side. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream". Hence, the upstream window side ("upstream side") is especially directed to the internal of the element and may receive, directly, or after internal reflection, light source radiation. The downstream window side ("downstream side") may especially be directed to the exterior of the element. This window side may e.g. (temporarily) be in contact with water during use of the system. Note that in plate-like embodiments of the element the upstream window side and a downstream window side may be both sides of the (same) edge (or plane).

As indicated above, especially the object, or the anti-biofouling system, may further comprise a control system. Hence, the object may comprise such control system. In embodiments the anti-biofouling system comprises the control system, but external from the object. Therefore, in embodiments the anti-biofouling system may further comprise a control system, optionally enclosed by the UV-emitting element. When the control system comprises more than one element, one or more elements may be comprised by the object and/or one or more elements may be configured external from the object.

In an embodiment, the control system comprises a plurality of control systems. For instance, the vessel may comprise a control system, as master control system, with each anti-biofouling system comprising a slave control system. Optionally, the control system may be configured external from the object, i.e. remote from the object. In specific embodiments, a master control system, remote from the object, controls the slave control system comprised by the object, (such as the anti-biofouling system). Hence, for instance the (master) control system may be far away; or not on the vessel, but ashore, such as in a control room of a shipping company. Such master control system may be configured to control anti-biofouling.

Especially, the system comprises a plurality of UV light sources. Even more especially, these may essentially be arranged in a regular pattern.

Hence, in embodiments the anti-biofouling system comprises a plurality of light sources, wherein neighboring light sources have mutual light source distances (d1) selected from the range of 0.5-200 mm, such as 2-100 mm In yet further embodiments, the biofouling system comprises a plurality of LEDs, wherein the LEDs are configured to generate said UV radiation, wherein the LEDs comprise LED dies, and wherein the LED dies of neighboring LEDs have mutual light source distances (d1) selected from the range of 0.5-200 mm, As already indicated above, the system may also comprise a plurality of light sources, wherein each light source is primarily directed to part of the radiation exit window.

Hence, especially the system is an anti-biofouling system. In embodiments, the anti-biofouling system comprises a waveguide element, such as a sheet-like light output device, wherein in further specific embodiments the light sources are embedded in the waveguide element. Especially, the waveguide element is watertight. Herein, the term "watertight" may in specific embodiments refer to International Protection Marking IPx5 or higher, such as IPX6, like especially IPx7 (immersion, up to 1 m depth), even more especially IPx8 (immersion, 1 m or more depth). The value of x is especially at least 4, like at least 5, such as 6.

As indicated above, in embodiments the UV-emitting element may be configured to irradiate with said UV radiation (during an irradiation stage) one or more of (i) said part of said external surface and (ii) water adjacent to said part of said external surface. The term "part" refers to part of the external surface of an object, such as e.g. a hull or a sluice (door). However the term "part" may also refer to substantially the entire external surface, such as the external surface of the hull or sluice. Especially, the external surface may comprise a plurality of parts, which may be irradiated with the UV light of one or more light sources, or which may be irradiated with the UV radiation of one or more UV-emitting elements. Each UV-emitting element may irradiate one or more parts. Further, there may optionally be parts that receive UV radiation of two or more UV-emitting elements.

In general, especially when referring to aquatic (such as marine) applications, there may be distinguished between two main embodiments. One of the embodiments includes the part of the external surface being irradiated with the UV radiation with between the light source and UV-emitting element water (or air when above the water line), such as sea water, at least during the irradiation stage. In such embodiment, the part is especially comprised by the "original" external surface of the object. However, in yet another embodiment, the "original" external surface may be extended with a module, especially a relatively flat module, that is attached to the "original" external surface of the object (such as the hull of a vessel), whereby the module itself forms in fact the external surface. For instance, such module may be associated to the hull of a vessel, whereby the module forms (at least part of) the external surface. In both embodiments the UV-emitting element especially comprises a radiating exit surface (see further also below). However, especially in the latter embodiment wherein the UV-emitting element may provide part of said external surface, such radiation exit window may provide the part (as the first part and the radiation exit window may essentially coincide; especially may be the same surface).

Hence, in an embodiment the UV-emitting element is attached to said external surface. In yet a further specific embodiment the radiation exit window of the anti-biofouling system is configured as part of said external surface. Hence, in some of the embodiments the object may comprise a vessel comprising a hull, and the UV-emitting element is attached to said hull. The term "radiation exit window" may also refer to a plurality of radiation exit windows (see also below).

In both general embodiments, the UV-emitting element is configured to irradiate with said UV radiation (during an irradiation stage) water adjacent to said part of said external surface. In the embodiments wherein the module itself forms in fact the external surface, the UV-emitting element is at least configured to irradiate with said UV radiation (during an irradiation stage) said part of said external surface, as it is in fact part of said external surface, and optionally also water adjacent to said part of said external surface. Hereby, biofouling may be prevented and/or reduced.

In an embodiment, a significant amount of a protected surface to be kept clean from fouling, preferably the entire protected surface, e.g. the hull of a ship, may be covered with a layer that emits germicidal light ("anti-fouling light"), in particular UV light.

In yet another embodiment, the UV radiation (anti-fouling light) may be provided to the surface to be protected via a waveguide, such as a fiber.

Hence, in an embodiment the anti-fouling lighting system may comprise an optical medium, wherein the optical medium comprises a waveguide, such as an optical fiber, configured to provide said UV radiation (anti-fouling light) to the fouling surface. The surface of e.g. the waveguide from which the UV radiation (anti-fouling light) escapes is herein also indicated as emission surface. In general, this part of the waveguide may at least temporarily be submerged. Due to the UV radiation (anti-fouling light) escaping from the emission surface, an element of the object that is during use at least temporarily exposed to the liquid (such as seawater), may be irradiated, and thereby anti-fouled. However, the emission surface per se may also be anti-fouled. This effect is used in some of the embodiments of the UV-emitting element comprising an optical medium described below.

Embodiments with optical media are also described in WO2014188347. The embodiments in WO2014188347 are herein also incorporated by reference as they are combinable with the control unit and/or water switch, and other embodiments, described herein.

As indicated above, the invention may also be applied for other applications than aquatic (such as marine) applications, like for (door) knobs, hospital curtains, or other medical and non-medical applications, etc.

As indicated above, the UV-emitting element may especially comprise a UV radiation exit window. Hence, in a specific embodiment the UV-emitting element comprises a UV radiation exit window, with the UV-emitting element especially being configured to provide said UV radiation downstream from said UV radiation exit window of said UV-emitting element. Such UV radiation exit window may be an optical window through which the radiation escapes from the UV-emitting element. Alternatively or additionally, the UV radiation exit window may be the surface of a waveguide. Hence, UV radiation may be coupled in the UV-emitting element into the waveguide, and escape from the element via a (part of a) face of the waveguide. As also indicated above, in embodiments the radiation exit window may optionally be configured as part of the external surface of the object. Another term for "escape" can be "outcoupling".

Especially, the (solid state) light source is at least controllable between a first UV radiation level and a second UV radiation level, wherein the first UV radiation level is larger than the second UV radiation level (and wherein the second UV radiation level is smaller than the first radiation level or may even be zero). Hence, in an embodiment the light source can be switched off and can be switched on (during a radiation stage). Further, optionally also the intensity of the UV radiation may be controlled between these two stages, such as a stepwise or continuous UV radiation intensity control. Hence, the light source is especially controllable (and thus its UV radiation intensity is).

In (aquatic (such as marine)) embodiments, the anti-biofouling system is especially configured to provide UV radiation to the part of the object or to water adjacent to this part. This especially implies that during an irradiation stage the UV radiation is applied. Hence, there may optionally also be periods wherein no UV radiation is applied at all. This may (thus) not only be due to e.g. a control system switching of one or more of the UV-emitting elements, but may e.g. also be due to predefined settings such as day and night or water temperature, etc. For instance, in an embodiment the UV radiation is applied in a pulsed way.

Hence, in a specific embodiment or aspect, the anti-biofouling system is configured for preventing or reducing biofouling on a fouling surface of an object that during use is at least temporarily exposed to water, by providing an anti-fouling light (i.e. UV radiation) to said fouling surface or water adjacent thereto. Especially, the anti-biofouling system may be configured to provide said anti-fouling light via an optical medium to said fouling surface, wherein the UV-emitting element further comprises (ii) said optical medium configured to receive at least part of the UV radiation (anti-fouling light), the optical medium comprising an emission surface configured to provide at least part of said UV radiation (anti-fouling light). Further, especially the optical medium comprises one or more of a waveguide and an optical fiber, and wherein the UV radiation (anti-fouling light) especially comprises one or more of UVB and UVC light. These waveguides and optical media are herein further not discussed in detail.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily to scale.

DETAILED DESCRIPTION OF THE EMBODIMENTS

Figure 1A:
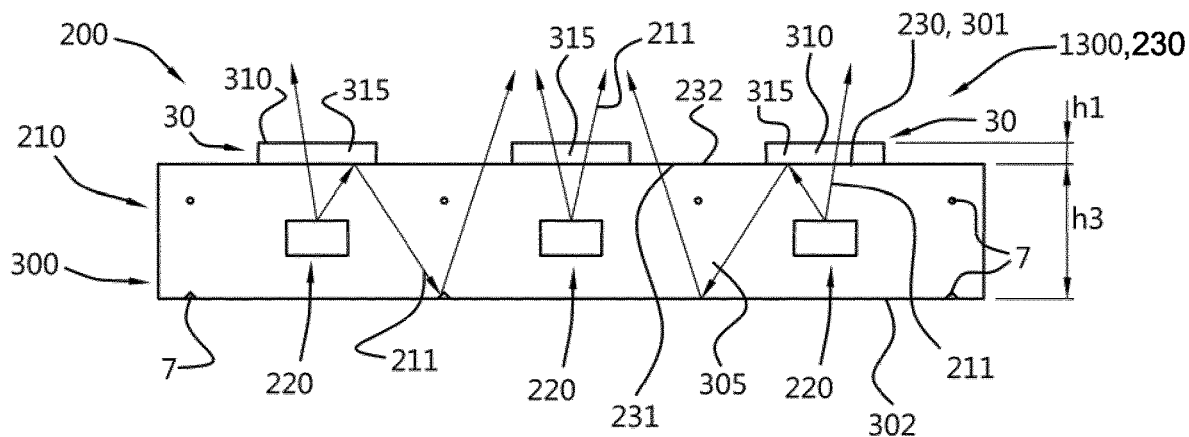
FIGS. 1a-1h schematically depict some general aspects.

FIG. 1a schematically depicts an embodiment of an anti-biofouling system 200 which comprises an UV-emitting element 210. The UV-emitting element 210 comprises a UV radiation exit window 230. The UV-emitting element 210 at least partly encloses a light source 220 configured to provide UV radiation 221 (anti-fouling light). Here, by way of example three light sources 220 are depicted. Here, the UV-emitting element 210 is configured as waveguide or light guide, with elements embedded therein. Hence, the light sources 220 are —in this schematically depicted embodiment—embedded in the waveguide. The UV radiation exit window 230 is configured to transmit at least part of the UV radiation 221 of the light source 220. The UV radiation exit window 230 comprises an upstream window side 231, here directed to the light source(s) and a downstream window side 232. In FIG. 1a, a light guide element 1300 comprising a light guide 300 or optical medium and a first layer element 30 is schematically depicted. The light guide 300 comprises a first light guide face 301, which comprises the radiation exit window 230. The light guide 300 may especially be a plate with the first light guide face 301 and a face opposite thereof, indicated with second light guide face 302. The distance between those faces may define a thickness or height of the light guide 300, indicated with reference h3 (the length and width (see also FIG. 2e, may be much larger than the height). The second face 302 may include a reflective layer. The first layer element 30 comprises an optical layer 310. The optical layer 310 is in contact with at least part of the first light guide face 301. The optical layer is in physical contact with at least part of the first light guide face. Especially, the optical layer 310 has a first index of refraction n1 smaller than 1.36 at 280 nm. Further, the light guide 300 comprises a UV radiation transmissive light guide material 305 (such as a silicone). The optical layer 310 comprises an optical layer material 315. This optical layer material 315 is especially transmissive for UV radiation but has an index of refraction smaller than water. In this way, the layer reduces outcoupling from the UV radiation when the light guide element 1300 is applied in aquatic environments, and may enhance outcoupling of radiation at other parts of the first light guide face. The optical layer 310 is configured on the downstream window side 232. Here, by way of example the light guide 300 comprises optical structures 7. These may be within the guide or at the faces of the light guide 300. The optical structures 7 may be configured to provide an even distribution of the UV radiation 221 escaping from the UV emitting element 210. Here, the light sources 220 are depicted as being comprised by the light guide element 1300; however, this is not necessarily the case (see also FIG. 2c.

The light guide element 1300 in combination with the light source(s) 220 can e.g. be used as lighting module for anti-fouling of a (protected) surface. Such module may comprise (thus) at least one light source for generating an anti-fouling light, an optical medium for distributing at least part of the anti-fouling light through the optical medium, the optical medium comprising an emission surface for emitting the distributed anti-fouling light in a direction away from the protected surface when the lighting module is arranged in, on and/or near the protected surface. The emission surface may be a substantially planar surface. The emission surface is the UV radiation exit window 230 including the first layer element 30/is the first light guide face 301 including the first layer element 30.

Figure 1B:
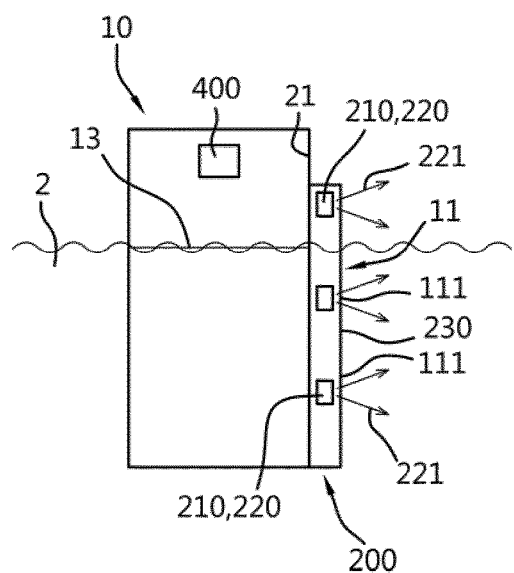
Figure 1C:
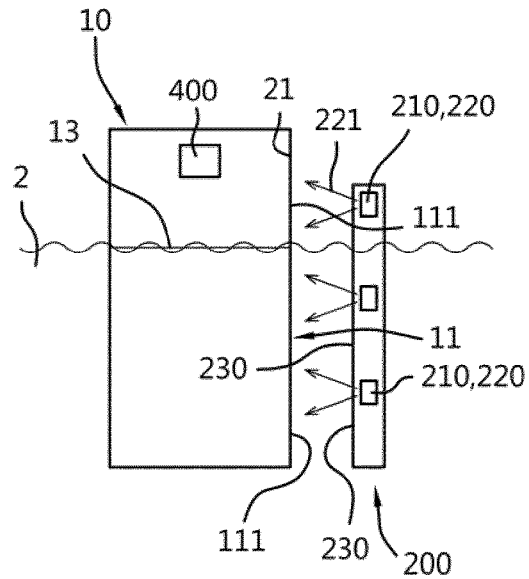
Figure 1D:
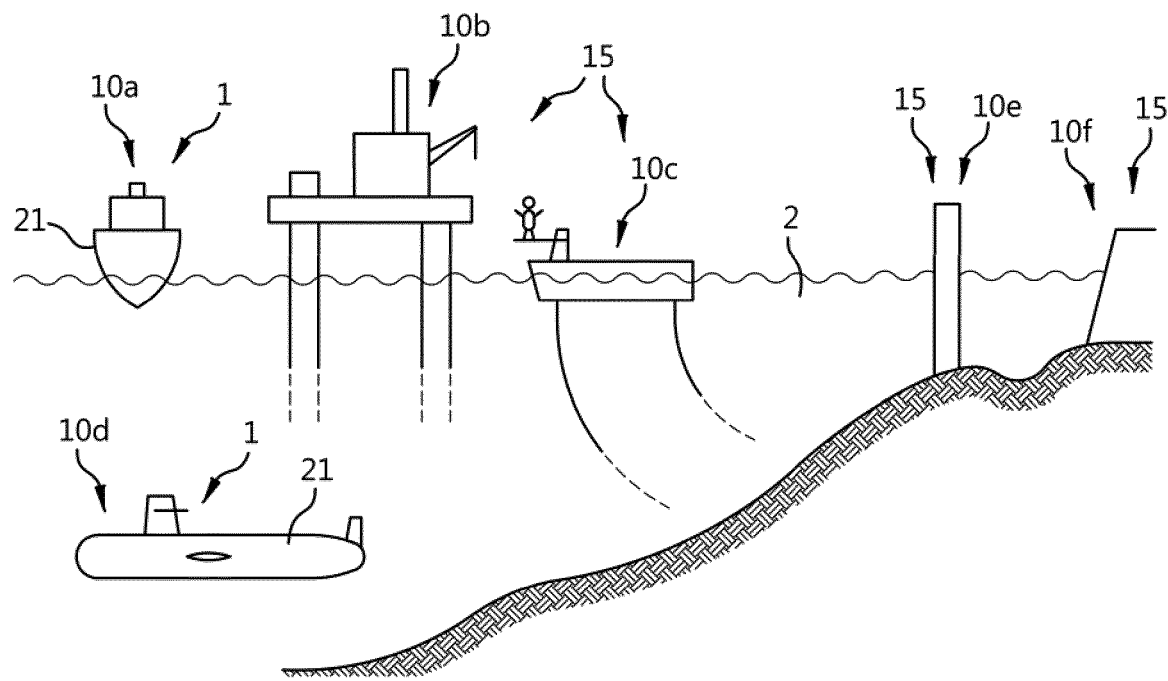

FIGS. 1b-1d schematically depict embodiments of an object 10 that during use is at least partly submerged in water 2, see the water line 13. The object 10, such as a vessel or a sluice, see also below, further comprises an anti-biofouling system 200 comprising an UV-emitting element 210, especially for application of UV radiation 221 to a part 111 of a surface 11, such as an external surface, of the object 10, such as a hull or part or a hull. Here, two embodiments are shown wherein the anti-biofouling system 200, or more especially the UV-emitting element 210 is part of an outer surface, and thereby forms in fact part of the outer surface (FIG. 1a) or wherein the UV-emitting element 210 is configured to irradiate the outer surface and does not necessarily form part of an outer surface, such as a hull of a ship (FIG. 1c). For instance, the object 10 is selected from the group consisting of a vessel 1 and an infrastructural object 15 (see also below). Reference 400 in amongst others FIG. 1b refers to a control system, which may in embodiments control the light source(s) 220 of the anti-biofouling system 200.

The UV-emitting element 210 comprises one or more light sources 220 and may thus especially be configured to irradiate with said UV radiation 221 during an irradiation stage one or more of (i) said part 111 of said external surface 11 and (ii) water adjacent to said part 111 of said external surface 11. The former variant applies especially the embodiment of FIG. 1c, and the latter embodiment especially applies to both embodiments of FIGS. 1b-1c. Note however that when a surface, such as an external surface, of the UV-emitting element 210 is configured as external surface of the object 10, of course the part 111 is irradiated per se with the UV radiation 21.

Hence, the UV-emitting element 210 comprises a UV radiation exit window 230 and the UV-emitting element 210 is configured to provide said UV radiation 221 downstream from said UV radiation exit window 230 of said UV-emitting element 210.

As indicated above, the term "vessel", indicated with reference 1, may e.g. refer to e.g. a boat or a ship (ref. 10a in FIG. 1d), etc., such as a sail boat, a tanker, a cruise ship, a yacht, a ferry, a submarine (ref. 10d in FIG. 1d), etc. etc., like schematically indicated in FIG. 1d. The term "infrastructural object", indicated with reference 15, may especially refer to aquatic applications that are in general arranged substantially stationary, such as a dam/sluice (references 10e/10f in FIG. 1d), a pontoon (ref. 10c in FIG. 1d), an oilrig (ref. 10b in FIG. 1d), etc. etc.

Figure 1E:
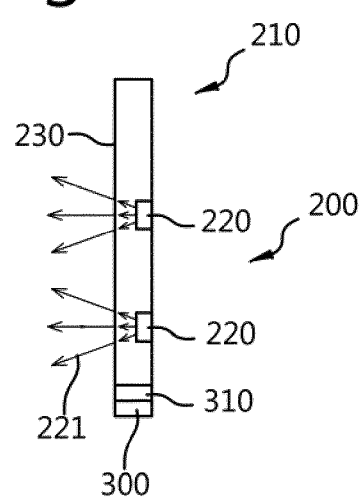

FIG. 1e schematically depicts in more detail an embodiment of the anti-biofouling system 200, here by way of example including an integrated control system 300 and an integrated sensor 310.

Figure 1F:
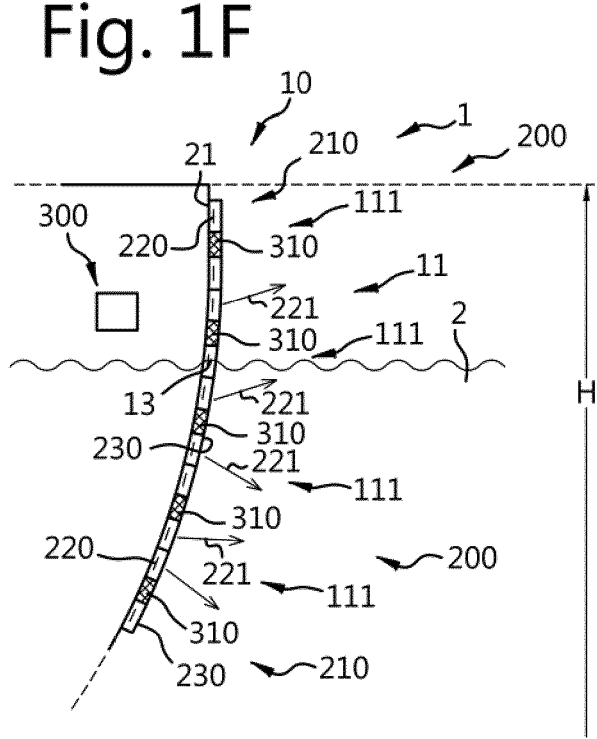

FIG. 1f schematically depicts a surface 11, such as an external surface, of an object 10, such as a vessel wall or a wall of an infrastructural object, with by way of example a plurality UV-emitting elements 210 (here associated to a hull 21 of a vessel 1). Alternatively or additionally, a plurality of functionally coupled or independently functioning anti-biofouling systems 200 may be applied.

FIG. 1f also schematically depicts the embodiment wherein the anti-biofouling system 200 comprises a plurality of UV-emitting elements 210 (with a plurality of light sources), a plurality of radiation exit windows 230, and a plurality of said parts 111, wherein the plurality of light sources 220 are configured to provide said UV radiation 221 via said plurality of radiation exit windows 23 to said plurality of parts 111, and wherein said plurality of parts 111 are configured at different heights of the object 10, and wherein the control system 300 is configured to control the light sources 220 individually as function of said input information. For instance, in an embodiment the control system 300 may be configured to control the light sources 220 individually as function of the positions of the parts 111 of the external surface 11 relative to the water.

Figure 1G:
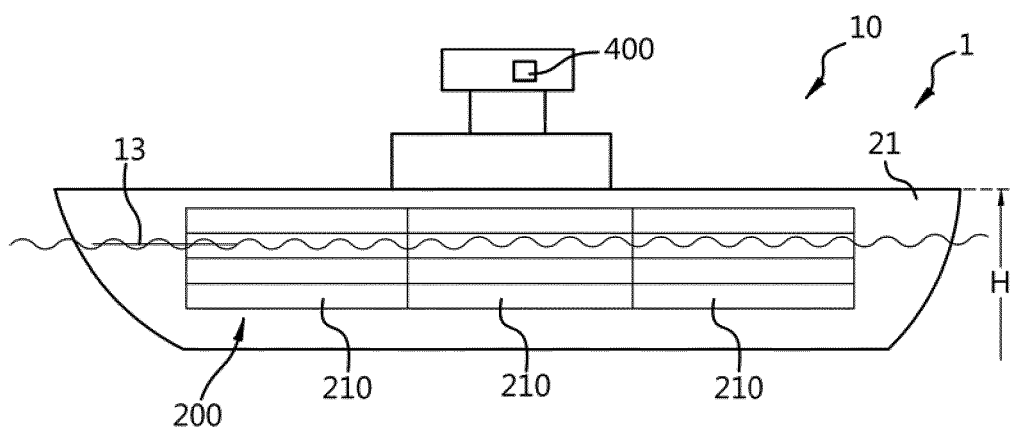

FIG. 1g schematically depicts an embodiment wherein a vessel 1, as embodiment of the object 10, comprises a plurality of anti-biofouling systems 200 and/or a one or more of such anti-biofouling systems 200 comprising a plurality of UV-emitting elements 210. Dependent upon the height of the specific such anti-biofouling system 200 and/or the height of the UV-emitting elements 210, such as relative to a water (line), the respective UV-emitting elements 210 may be switched on.

Figure 1H:
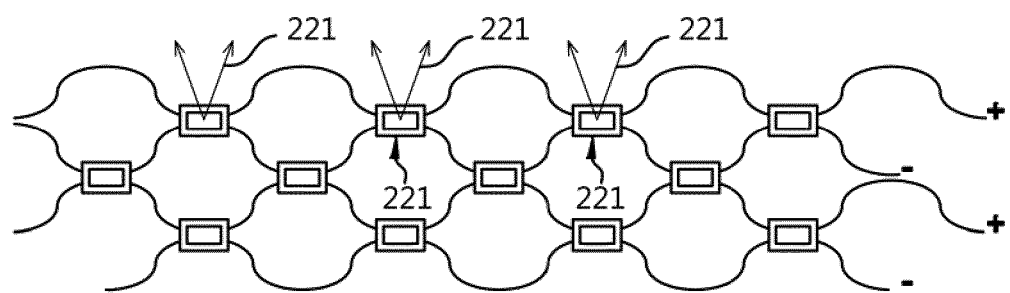

FIG. 1h shows a chicken-wire embodiment where light sources 210, such as UV LEDs, are arranged in a grid and connected in a series of parallel connections. The LEDs can be mounted at the nodes either through soldering, glueing or any other known electrical connection technique for connecting the LEDs to the chicken wires. One or more LEDs can be placed at each node. DC or AC driving can be implemented. If AC is used, then a couple of LEDs in anti parallel configuration may be used. The person skilled in the art knows that at each node more than one couple of LEDs in anti parallel configuration can be used. The actual size of the chicken-wire grid and the distance between UV LEDs in the grid can be adjusted by stretching the harmonica structure. The chicken-wire grid may be embedded in an optical medium. Above, especially active prevention applications are described, wherein the anti-biofouling system 200 switches off, or switches specific UV-emitting elements 210 or specific light sources 220 off, dependent upon contact with the water, a signal of a sensor, etc. etc. However, alternatively or additionally, also warning signals or messages may be used to warn a person of danger.

Figure 2A:
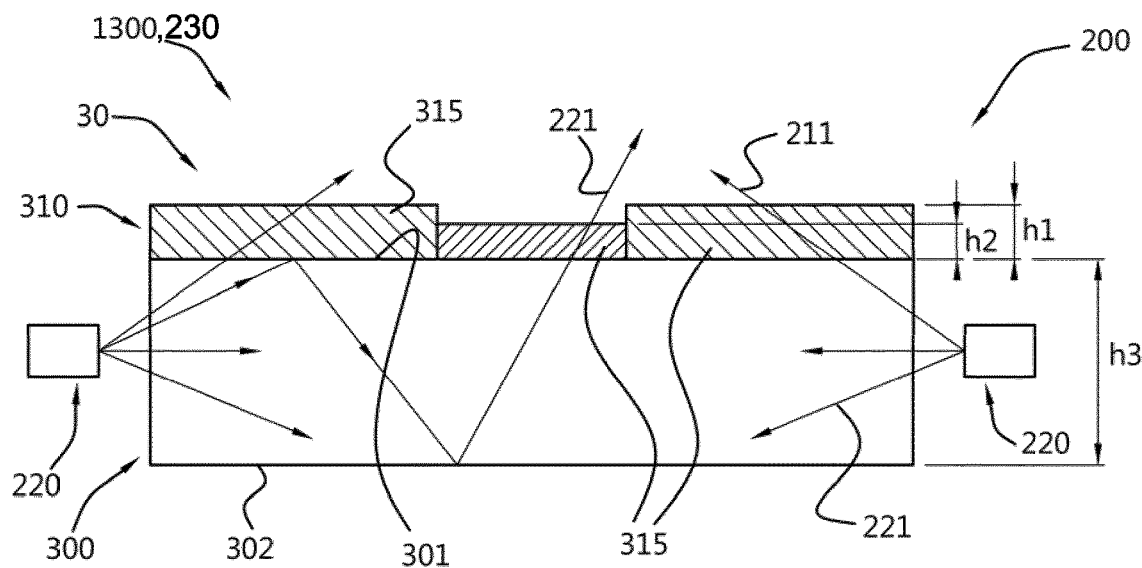
FIGS. 2a-2f schematically depict some embodiments.

FIG. 2a schematically depicts an embodiment wherein the optical layer 310 is a patterned optical layer 310. One or more first regions 311 may comprising said optical layer material 315 with a first layer thickness h1. One or more second regions 312 may comprising said optical layer material 315 with a second layer thickness h2 in the range of $0 \leq h2 < h1$. Here, $h2 \neq 0$. Note that the different regions may comprise different optical layer materials 315 or the same optical layer materials. Especially when the entire first light guide face is in physical contact with the optical layer 310, the optical layer 310 comprises UV radiation transmissive optical layer material 315. The thickness of the layer (h1, or h1 and h2) may depend upon the distance to the closest light source; especially closer to a light source $h1 \neq 0$ and further away from the light source in embodiments $h2=0$. The transmission of the UV radiation through the optical layer (i.e. through height h1 (and/or h2)) is especially at least 10%, such as even more especially at least 20%, such as at least 40%, like in the range of 40-95%, or even higher (i.e. for UV radiation that is not directed back into the light guide 300). This especially applied to UV radiation propagating in a direction substantially perpendicular to the first light guide face 301 (in a direction away from the light guide and thus through the optical layer with the indicated layer height h1 (or h2; if any)).

Figure 2B:
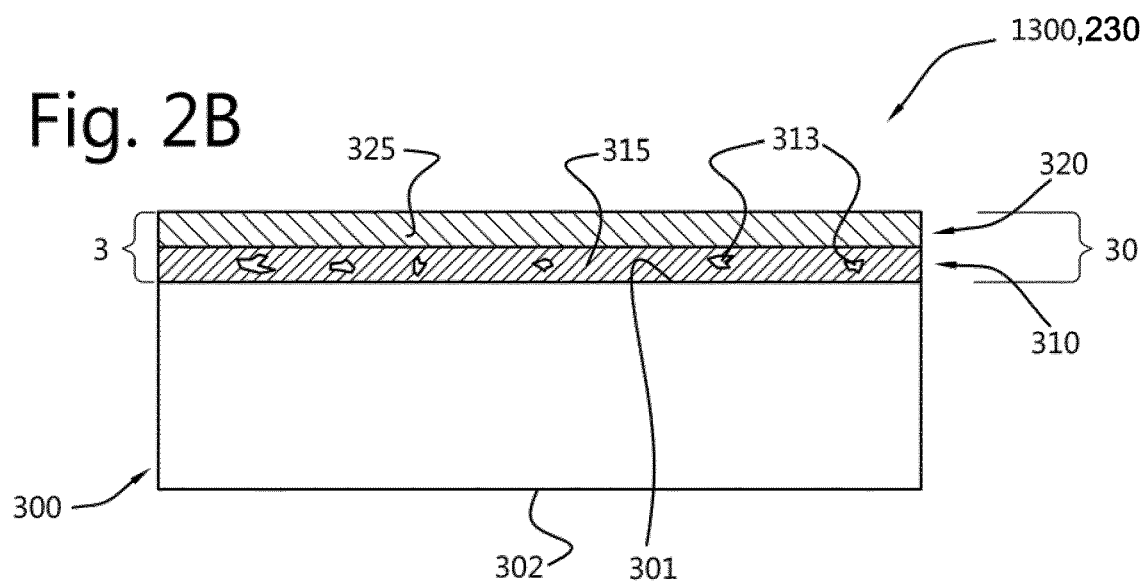

Further, here by way of example a first region and a second region are indicated. Also more than two different regions may be applied FIG. 2b schematically depicts a combination of embodiments. Amongst others, this drawing schematically depicts a porous optical layer 310. The optical layer includes pores or cavities, indicated with reference 313. These may be filled with a gas, such as a noble gas or air. Further, the first layer element 30 comprises a layer stack 3 comprising said optical layer 310 and further comprising a second layer 320 in contact with at least part of said optical layer 310. In embodiments, the second layer 320 is water impermeable. Especially when the second layer covers substantially the entire first light guide face, the second layer 320 comprises a UV radiation transmissive optical layer material 325. As indicated above, the optical layer may be configured over the entire first light guide face, such as in FIG. 2b, but may in other embodiments also be available on only part of the first light guide face, such as in FIG. 1a.

Figure 2C:
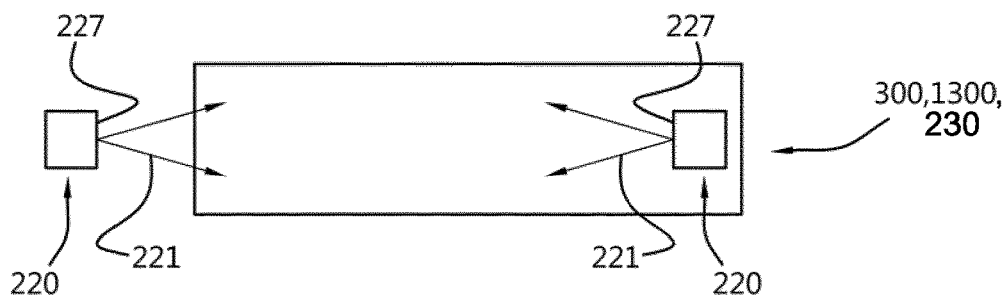

FIG. 2c schematically depicts variants wherein the light source 220 is configured external from the light guide 300 (left) and configured at least partly within the light guide 300. The light source 220 comprises a light emitting face 227. In the latter variant, the light emitting face 227 is configured within the light guide 300.

Figure 2D:
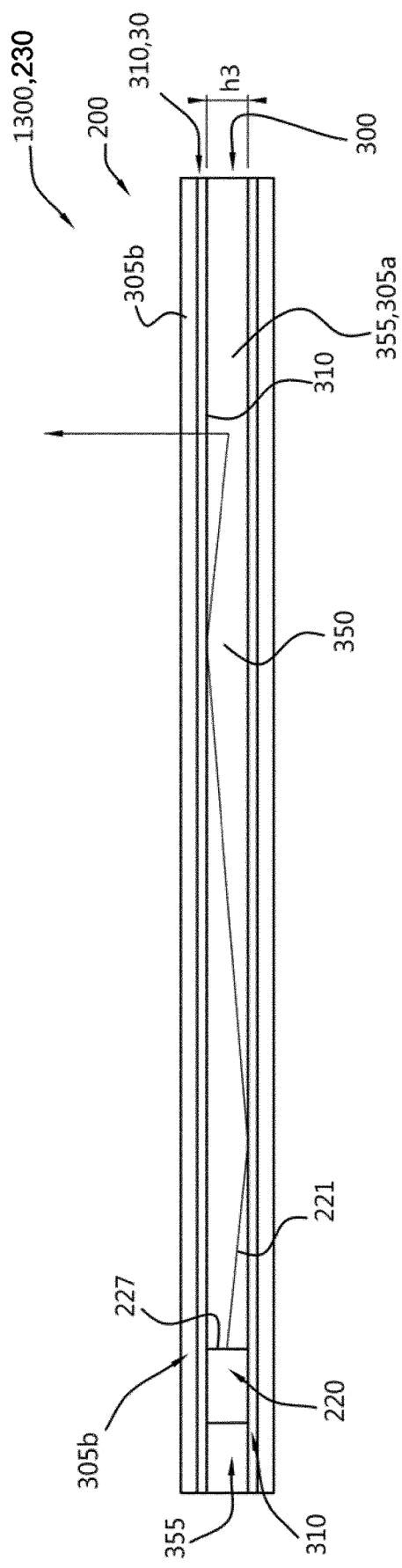

FIG. 2d schematically depicts an embodiment wherein the light guide 300 comprises a closed cavity 350 filled with a UV radiation transmissive liquid 305a. The light guide 300 may in this embodiment comprises a first material 305b, especially comprising silicone. The first material 305b may define the cavity 350. Here, in fact the optical layer 310 may define the cavity 350. The UV radiation transmissive liquid 305a may e.g. comprise demineralized water. Would such light guide element 1300 be used in the anti-biofouling system, the system may include a pump for moving, such as circulating, the liquid 305a. Such pump may be controlled by the herein mentioned control system.

Figure 2E:
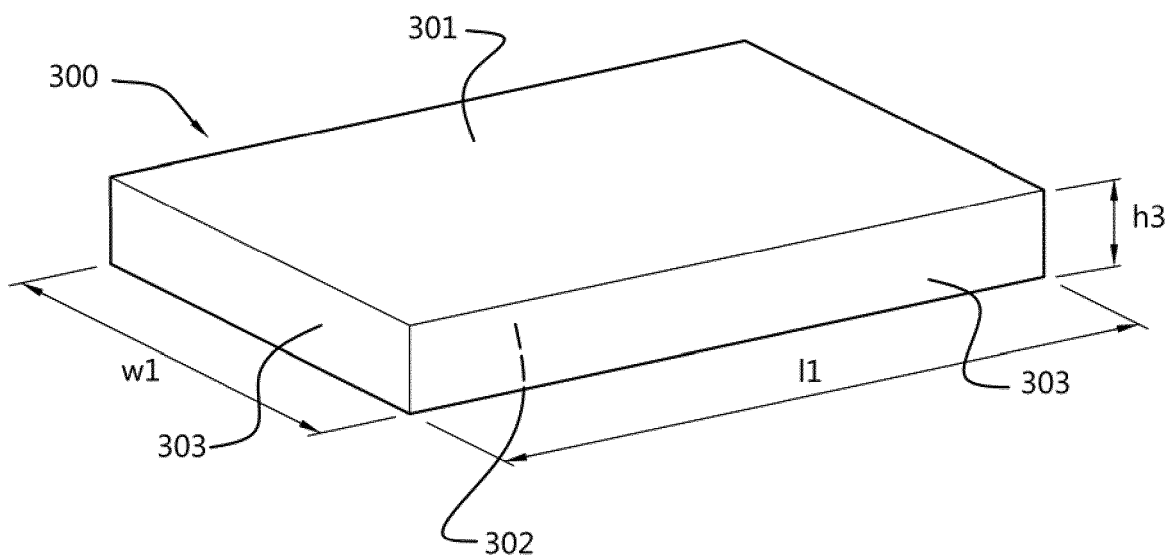
Figure 2F:
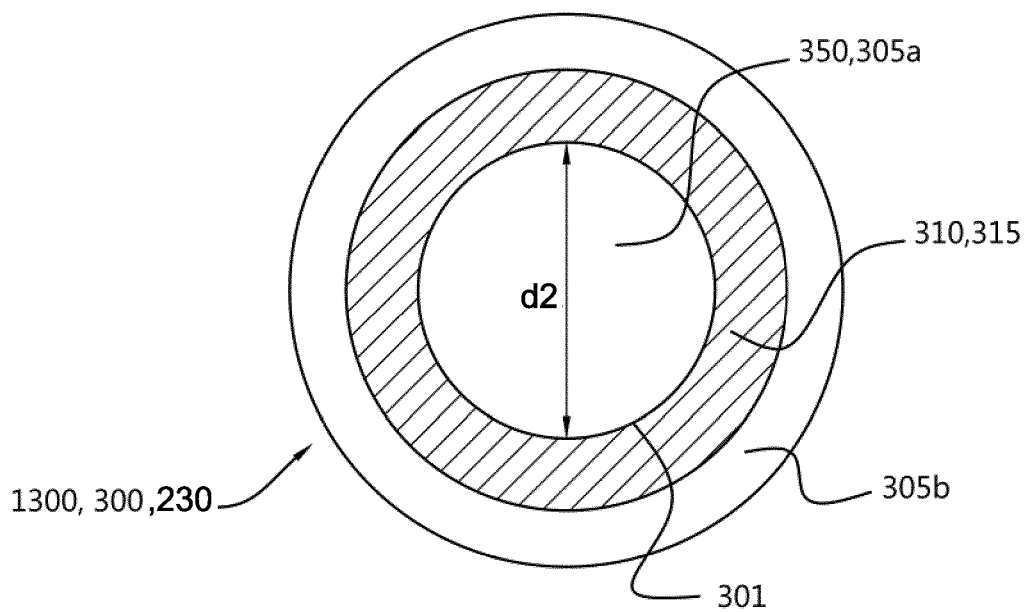

FIGS. 2e and 2f very schematically depicts two variants of the light guide 300, with an elongated plate, such as a silicone plate (which may effectively be a coating on an object), or a channel like system. The diameter of the latter is defined as d2. The dimension of the diameter may be substantially the same as those defined herein for the height h3 of the light guide 300. With respect to the former variant, the light guide may have a height substantially smaller than a length or a width, such as at least 5 times smaller. In FIG. 2e, the length of the plate is indicated with reference 11 and the width is indicated with reference w1. Especially, w1/h3≥5 and 11/h3≥5. The top face, here the first light guide face 301 (optical layer not indicated) may be used as outcoupling face. The face opposite of the first light guide face 301 is indicated with reference 302, and is here the bottom face. This face may include a reflector. The edge(s) 303 may be used to couple light UV radiation into the light guide 300, assuming light sources external from the light guide 300. Edges not used, and/or in embodiments wherein the light sources have light emitting faces within the light guide 300, the edge(s) 303 may include reflective material. The length of the light guide 300 in FIG. 2f is perpendicular to the diameter and along an axis of elongation of the light guide. Hence, the light guide may in embodiments be a fiber.

Figure 3:
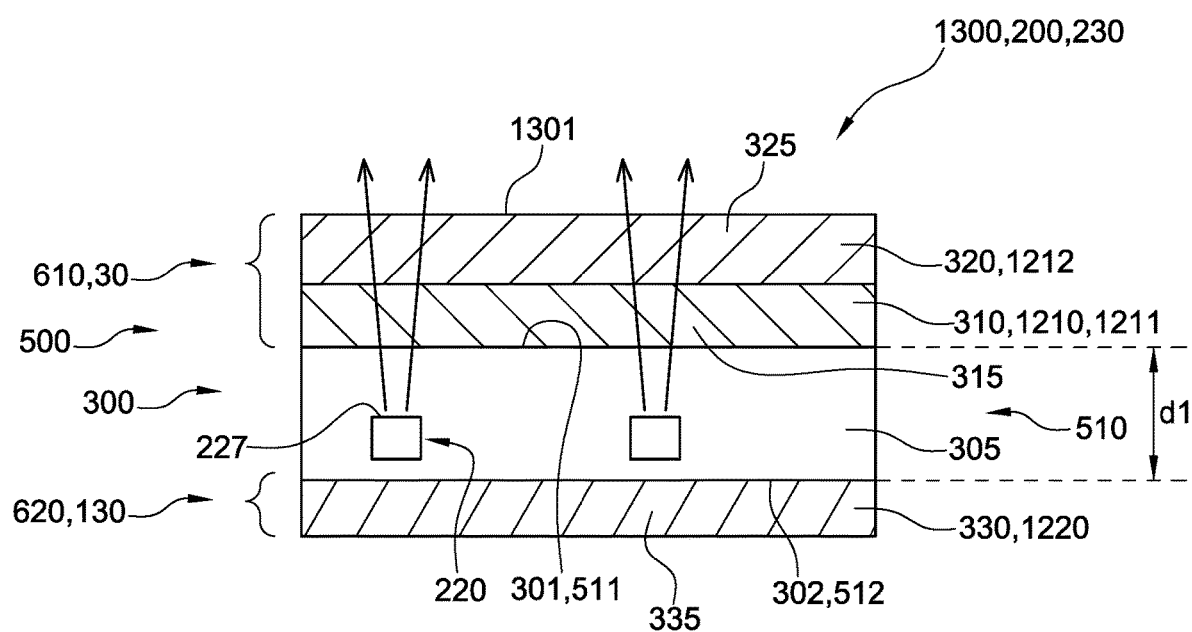
FIG. 3 schematically depicts some variants which may be applied, optionally in combination.

FIG. 3 schematically depicts an embodiment of the layer stack 500. The layer stack 500 comprises a first layer, especially a first silicone layer 510. This first layer has a first surface 511 and a second surface 512 defining a thickness d1 of the first silicone layer 510. The first silicone layer 510 is transmissive for UV radiation having one or more wavelengths selected from the range of 200-380 nm. Hence, when UV radiation, having a wavelength selected from the this range, would impinge on the first surface 511, then at least part of the UV radiation will also escape from the second surface 512, especially a substantial part, as the first layer 510 is transmissive for UV radiation. Therefore, this first layer 510 is also indicated as light guide 300.

The layer stack comprises one or more of a first layer element 610 and a second layer element 620. Here, one of the possible embodiments with both layer elements is depicted.

The first layer element 610 is configured at a first side of the first surface 511. The first layer element 610 is associated by a chemical binding (not shown) with the first surface 511 directly (or via a first intermediate layer), which is transmissive for UV radiation having one or more wavelengths selected from the range of 200-380 nm. The first layer element 610 at least comprises a first layer 1210 differing in composition from the first silicone layer 510. The first layer element may also comprise a plurality of layers, of which at least one differs in composition from the first layer. In general, all layers of the first layer element will differ in composition from the first layer.

Here, by way of example, the first layer element comprises two layers, indicated with references 1211 and 1212, with the former being chemically bound to the first layer 510 and with the latter (chemically) bound to the former. The first layer element 610 is transmissive for UV radiation having one or more wavelengths selected from the range of 200-380 nm. Layer 1211 may e.g. comprise a thin Al layer and layer 1212 may e.g. comprise a FEP layer.

The second layer element 620 is configured at a second side of the second surface 512. The second layer element 620 is associated by a chemical binding (not shown) with the second surface 512 directly (or via a second intermediate layer). The second layer element 620 at least comprises a second layer 1220 differing in composition from the first silicone layer 510. The second layer element may also comprise a plurality of layers, of which at least one differs in composition from the second layer. In general, all layers of the second layer element will differ in composition from the second layer.

The layer stack (500) further comprises one or more, especially a plurality of solid state light sources 220 embedded in the first silicone layer 510. Energy may be provided via an external electrical power source and/or an internal electrical power source, such as one or more of a battery, a solar cell, etc. These electrical parts are not shown for the sake of clarity.

Hence, FIG. 3 schematically depicts thus also a further embodiment of the light guide element 1300 and the anti-biofouling system 200, wherein a plurality of variants are included, which may independently be used or which may be applied in combination.

For instance, in this schematically depicted embodiment the light source 220 are at least partially, here essentially entirely, embedded in the light guide 300. Hence, the light source(s) comprise a light emitting face 227, wherein the light emitting face 227 is configured within the light guide 300. Especially, the light emitting face is the die of a solid state light source (220).

Further, the light guide element 1300 comprises a first stack 30, comprising at least a layer, here by way of example two layers, wherein a first layer is the optical layer 310, and wherein a second layer 320 may e.g. be used as protective layer. The optical layer 310 is in contact with the first light guide surface 301. The optical layer material 315 and the second layer material, indicated with reference 325, is especially transmissive for UV radiation.

Alternatively or additionally, a second stack 130, comprising a least a layer, here by way of example a single layer, indicated as third layer 330, is available. The layer stack, here the third layer 130, is in contact with the second light guide surface 301. The third layer may comprise third layer material 335, which may in embodiments be identical to the optical layer material 315, but which in other embodiments may be essentially reflective, and/or which may in other embodiments be adhesive. For instance, the third layer 330 may be applied to arrange the light guide element 1300, more precisely the light guide layer 300 to a surface 11 of an object.

The light guide 300 has a first light guide surface 301. When the first layer element 30 is available, the external surface of the light guide element 1300 is now effectively a surface of an external layer, herein indicated as 1301. Hence, reference 1301 indicates an outer layer of the light guide element 1300. The radiation exit window can be considered the layer (stack) between first light guide surface 301 and the outer layer 1301.

Hence, there may be a top layer or top foil and/or there may be a bottom layer or top foil. The former may be indicated more general as optical layer, or may be more general be comprised by a layer stack. The latter may be indicated more general as third layer, or may be more general comprise by a second layer stack.

The top foil/layer may especially be applied to protect the light carrier against mechanical damage. Further, it may be to be sufficiently transparent for UVC.

The optical layer, or the (first) layer stack may provide a protection against chemical intrusion of unwanted molecules which may destroy the transparency of the light carrier.

The second layer may especially have a good resistance against tear. The second layer may have a lower refraction index compared to silicone to propagate the UVC light further through the silicone before it is emitted to the surface. This becomes more important if the silicone layer is very thin (≤2 mm) or if the silicone is highly transparent. This effect may also be obtained by adding a sol-gel layer, as embodiment of the optical layer, in between the light carrier and the top foil (see also above).

The bottom foil may especially be applied to reflect light back to the surface, into the light guide. The third layer may be a chemical interface enabling us to attach other layers to it at the bottom side, such as lead frames carrying wires and electronics.

Also the third layer may have a lower refraction index compared to silicone to propagate the UVC light further through the silicone before it is emitted to the surface. This effect may also be obtained by adding a sol-gel layer (see also above), as embodiment of the optical layer, in between the light carrier and the third layer.

Suitable materials for the second layer or for the third layer or for both the second layer and the third layer may be selected from the group of PET (Polyethylene terephthalate) and FEP (Fluorinated ethylene propylene). Other materials may also be possible. Alternatively or additionally, suitable materials for the second layer or for the third layer or for both the second layer and the third layer may be selected from silicone materials (but different from the light guide material in embodiments wherein the light guide material would also comprise a silicone). The materials of the second layer and third layer may be different.

FIGS. 4a-4e schematically depict some further aspects.

Figure 4A:
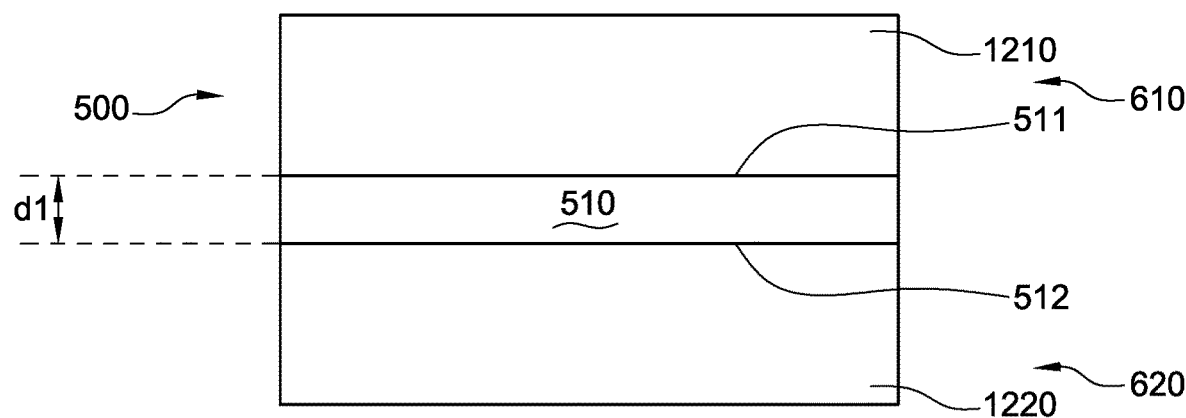
FIGS. 4a-4e schematically depict some variants and aspects.

FIG. 4a schematically depicts an embodiment including both a first layer element 610 and a second layer element 620. Both layer elements include by way of example a single layer, indicated with references 1210 and 1220, respectively.

Figure 4B:
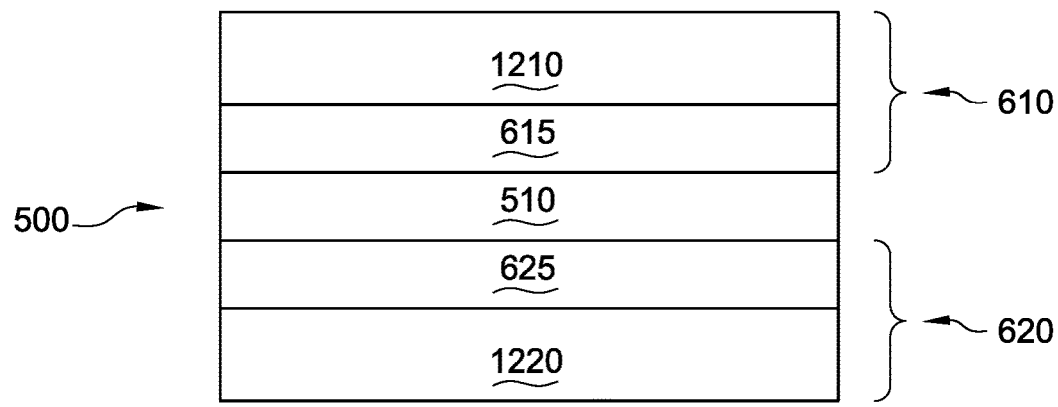

FIG. 4b schematically depicts an embodiment wherein intermediate layers 615 and 625, respectively are applied. Of course, only one of these can be applied, either as first intermediate layer 615 comprised by the first layer element 610, or as second intermediate layer 625 comprised by the second layer element. An example of providing such intermediate layer may be by applying a liquid silicone to a layer activated with functional groups, in the presence of a primer (at the interface). This may lead to chemical binding between the silicone and the layer with the functional groups.

Figure 4C:
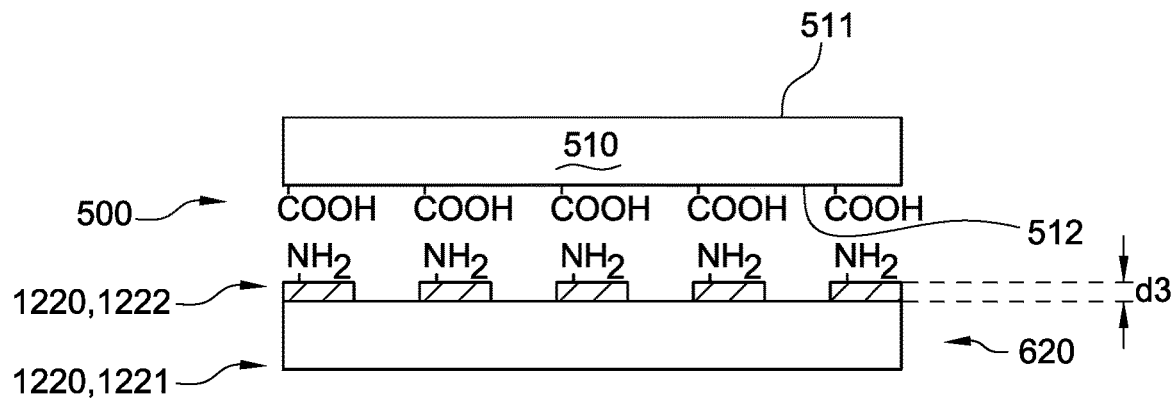
Figure 4D:
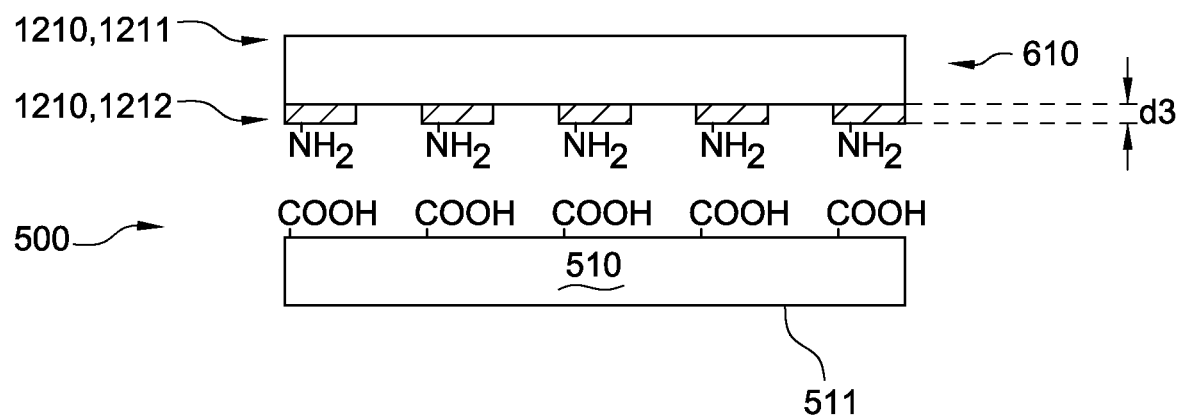

FIGS. 4c and 4d schematically show some of the possible embodiments to generated a chemical binding, with, by way of example both an discontinuous aluminum layer on a continuous layer, which together provide for instance the second layer element 620 (FIG. 4c) or the first layer element (FIG. 4d). The aluminum layer may e.g. be deposited via the vapor phase. The first layer 510 may e.g. be functionalized with COOH groups; the Al layer may e.g. be functionalized with $NH_2$ groups. When contact to each other, a chemical bound layer stack may be provided.

Figure 4E:
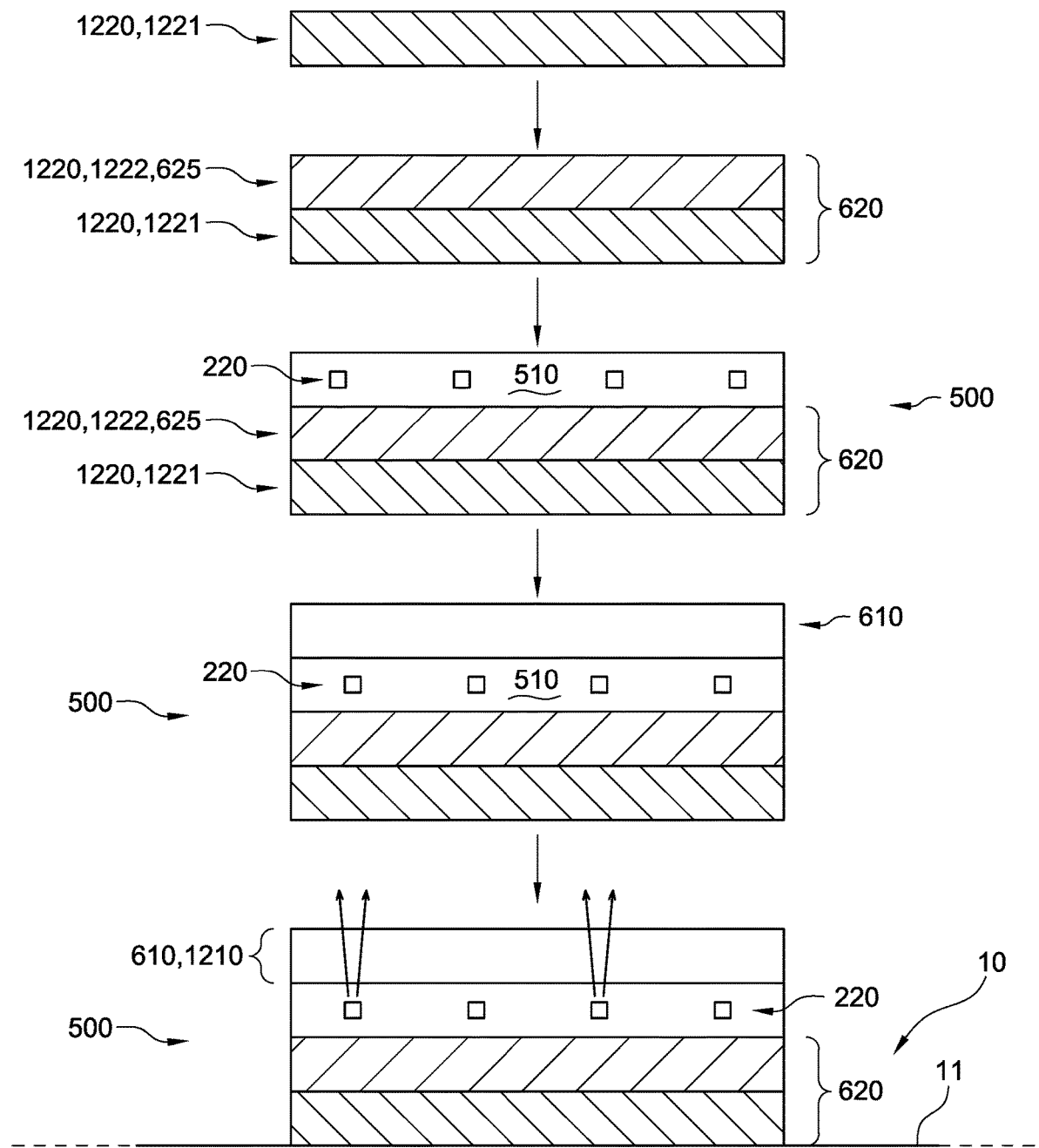

FIG. 4e schematically depicts an embodiment of the method of the invention for providing a layer stack 500, though other embodiments may be possible (see also above). The method comprises binding (i) a first silicone layer 510 and (ii) one or more of a first layer element 610 and a second layer element 620, by one or more of (a) associating by a chemical binding a first surface 511 of the silicone layer 510 and the first layer element 610 directly, or via a first intermediate layer 615, and (b) associating by a chemical binding a second surface 512 of the silicone layer 510 and the second layer element 610 directly, or via a second intermediate layer 625. Here, also an embodiment is shown wherein the method further comprises providing the layer stack 500 to at least part of a surface 11 of an object 10.

First, a layer of essentially transparent material is provided, wherein particulate material, such as $BaSO_4$ and/or BN is provided for scattering purposes. This layer may e.g. FEP. The FEP layer may be activated with functional groups (not shown) and (unhardened) functionalized silicone may be provided thereon, with a primer at the interface, to provide a further layer indicated with reference 1220, though this may also be indicated as a second intermediate layer 625. The thus provided second layer element 620 and a first (silicone) layer 510, which may also be activated with functional groups, may be combined, with a primer at the interface, to provide the stack 500. Here, the first (silicone) layer comprises light sources 220. Further, this may be combined with a protective layer, such as a thin Al layer or a polymeric layer. This additional layer, which provides in this embodiment the first layer element 610 is indicated with reference 1210.

Amongst others, experimental work was done wherein a Lumisil 400 light guide was subject to a xylene environment. This experiment was repeated with a coating Lumisil 400, which was coated with a plasma activated FEP foil of 100 μm thickness. Also this stack was in the same way subject to a xylene environment. In the unprotected Lumisil, xylene appeared to penetrate into the Lumisil, as with time the UV transmission reduced. This is indicative of the presence of UV absorbing species, here by way of example xylene was chosen. However, the protected Lumisil had essentially no UV transmission reduction with time, which is indicative that xylene did not penetrate into the Lumisil via the FEP layer. The FEP layer is thus a good protector against ingress of organic molecules in the first silicone layer.

Essentially the same experiment was repeated, with the exception that the layers were not subjected to xylene, but brought into contact with an electrical cable. Even though the polymeric shielding is hardened, it appeared that the unprotected Lumisil absorb organic molecules (e.g. plasticizer) from the electrical cable, and the protected Lumisil does not. The effect is rather strong, as only physical contact already induced a transmission reduction of a few % per day for the unprotected Lumisil. Protection with e.g. FEP essentially solves this problem.

Examples and variations of some embodiments of stacks, on a hull, e.g. a steel hull, are indicated in the following table:

| Layer | Example of layers 1 | Example of layer 2 |
|---|---|---|
| 1 | Protective layer made of Fluor-polymer e.g. FEP. | Protective layer made of Fluor-polymer e.g. FEP. |
| 2 | Silicone with led's embedded | Silicone with led's embedded |
| 3 | Back side of same or another Fluor-polymer | — |
| 4 | Aluminum reflective layer (may be partially covering the surface = patterned) | Aluminum reflective layer, may also be patterned or even omitted, provided the layer underneath is UVC resistant. |
| 5 | Protective film of any polymer | Back side polymer, e.g. FEP or Kapton (polyimide) |
| Hull paint | anti-corrosion paint | anti-corrosion paint |
| Hull | (steel hull) | (steel hull) |

The term "plurality" especially refers to two or more. The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings. The various aspects discussed in this patent can be combined in order to provide additional advantages. Furthermore, some of the features can form the basis for one or more divisional applications.

The invention claimed is:
1. A layer stack comprising:
a first silicone layer,
wherein the first silicone layer has a first surface, a second surface, and a thickness between the first and second surfaces,
wherein the first silicone layer is transmissive for UV radiation having one or more wavelengths selected from the range of 200-380 nm,
one or more of a first layer element,
wherein the first layer element is arranged at a first side of the first surface,
wherein the first layer element is associated by a chemical binding with the first surface directly or via a first intermediate layer that is transmissive for UV radiation having one or more wavelengths selected from the range of 200-380 nm,
wherein the first layer element comprises a first layer differing in composition from the first silicone layer,
wherein an entirety of the first layer element comprises a material that is transmissive for UV radiation having one or more wavelengths selected from the range of 200-380 nm: and
a second layer element,
wherein the second layer element is arranged at a second side of the second surface, wherein the second layer element is associated by a chemical binding with the second surface directly or via a second intermediate layer, wherein the second layer element comprises a second layer differing in composition from the first silicone layer.

2. The layer stack according to claim 1, wherein the second layer element has one or more functionalities selected from the group consisting of reflective for UV radiation, adhesive for adhering the layer stack to an object, reinforcing the layer stack, and protective for the first silicone layer.

3. The layer stack according to claim 1, wherein the second layer element comprises one or more of an aluminum layer, a silicone layer comprising a particulate reflective material, a polymeric layer comprising a particulate reflective material, and a polymeric layer having an index of refraction smaller than of the first silicone layer, wherein the polymeric layer comprises a fluoropolymer.

4. The layer stack according to claim 1, wherein the second layer element comprises a layer comprising one or more of siloxane with particulate reflective material embedded therein, and polymeric material with particulate reflective material embedded therein, wherein the polymeric material comprises a fluoropolymer, wherein the particulate material comprises boron nitride.

5. The layer stack according to claim 1, wherein the second layer element comprises an aluminum layer, wherein the aluminum layer has a thickness of at least 100 nm.

6. The layer stack according to claim 1, wherein the first layer element has one or more functionalities selected from the group consisting of partly reflective for UV radiation, reinforcing the layer stack, and protective for the first silicone layer.

7. The layer stack according to claim 1, wherein the first layer element comprises one or more of an aluminum layer having a thickness that is at least 5 nm and not more than 20 nm, a silicone layer, and a polymeric layer comprising a fluoropolymer, wherein the polymeric material comprises one or more of fluorinated ethylene, fluorinated propylene, fluorinated ethylene propylene, and fluorinated propylene acetate.

8. The layer stack according to claim 1, wherein the chemical binding comprises one or more of an amide binding, an ester binding, an ether binding, and an Si—O—Al binding.

9. The layer stack according to claim 1, wherein one or more of the first intermediate layer and the second intermediate layer comprises a silicone layer having a composition different from the first silicone layer.

10. The layer stack according to claim 1, wherein the first layer element comprises a polymeric layer comprising a fluoropolymer, wherein the second layer element comprises one or more of an aluminum layer and a polymeric layer.

11. The layer stack according to claim 10, wherein the second layer element comprises a stack of a polymeric layer comprising a fluoropolymer, an aluminum layer, and a polymeric layer.

12. The layer stack according to claim 1, further comprising one or more solid state light sources embedded in the first silicone layer.

13. An object (10) comprising a surface, wherein the layer stack according to claim 1 is attached to at least part of the surface.

14. A system comprising:

the stack layer according to claim 1; and a UV light source, wherein the UV light source is arranged as an anti-biofouling system.

15. A layer stack comprising:

a silicone layer, wherein the silicone layer has a first surface and a second surface, wherein the silicone layer is transmissive for UV radiation having one or more wavelengths selected from the range of 200-380 nm, a first layer element, wherein the first layer element is arranged on the first surface, wherein the first layer element is transmissive for UV radiation having one or more wavelengths selected from the range of 200-380 nm, wherein the first layer element comprises a first layer differing in composition from the silicone layer, and wherein the first layer has a refractive index that is less than a refractive index of the silicone layer;

a second layer element, wherein the second layer element is arranged on the second surface, wherein the second layer element comprises a second layer differing in composition from the first silicone layer.

16. The layer stack of claim 15, wherein the refractive index of the first layer is less than a refractive index of seawater.

17. The layer stack of claim 15, wherein the refractive index of the first layer is less than 1.36 at 280 nm.

18. The layer stack of claim 15, wherein the first layer comprises pores.

19. The layer stack of claim 15, wherein the first layer comprises a fluoropolymer.

20. The layer stack of claim 15, wherein the second layer element comprises a second layer that has a refractive index that is less than a refractive index of the silicone layer.

* * * * *